US011550121B2

(12) United States Patent
Chang et al.

(10) Patent No.: US 11,550,121 B2
(45) Date of Patent: Jan. 10, 2023

(54) OPTICAL IMAGE CAPTURING SYSTEM

(71) Applicant: ABILITY OPTO-ELECTRONICS TECHNOLOGY CO., LTD., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 252 days.

(21) Appl. No.: 17/120,971

(22) Filed: Dec. 14, 2020

(65) Prior Publication Data

US 2022/0003960 A1 Jan. 6, 2022

(30) Foreign Application Priority Data

Jul. 3, 2020 (TW) .................................. 109122647

(51) Int. Cl.
| | |
|---|---|
| *G02B 9/14* | (2006.01) |
| *G02B 13/18* | (2006.01) |
| *G02B 13/00* | (2006.01) |
| *G02B 9/32* | (2006.01) |
| *G02B 13/02* | (2006.01) |
| *G02B 3/04* | (2006.01) |
| *G02B 3/02* | (2006.01) |
| *G02B 5/20* | (2006.01) |
| *G02B 9/12* | (2006.01) |

(Continued)

(52) U.S. Cl.
CPC ............... *G02B 9/14* (2013.01); *G02B 13/18* (2013.01); *G02B 3/02* (2013.01); *G02B 3/04* (2013.01); *G02B 5/20* (2013.01); *G02B 9/12* (2013.01); *G02B 9/16* (2013.01); *G02B 9/32* (2013.01); *G02B 13/002* (2013.01); *G02B 13/0035* (2013.01); *G02B 13/02* (2013.01); *G02B 27/0025* (2013.01)

(58) Field of Classification Search
CPC . G02B 9/14; G02B 13/18; G02B 9/12; G02B 9/16; G02B 9/32; G02B 13/002; G02B 13/02; G02B 13/0035; G02B 27/0025; G02B 3/04; G02B 3/02; G02B 5/20
USPC ........................................ 359/716, 784, 785
See application file for complete search history.

(56) References Cited

U.S. PATENT DOCUMENTS

| | | | | |
|---|---|---|---|---|
| 5,175,652 | A | * 12/1992 | Shimizu | ................. G02B 21/02 |
| | | | | 359/793 |
| 5,204,780 | A | * 4/1993 | Sakamoto | .............. G02B 13/18 |
| | | | | 359/689 |

(Continued)

*Primary Examiner* — Evelyn A Lester
(74) *Attorney, Agent, or Firm* — Birch, Stewart, Kolasch & Birch, LLP

(57) ABSTRACT

The invention discloses a three-piece optical lens for capturing image and a three-piece optical module for capturing image. In order from an object side to an image side, the optical lens along the optical axis comprises a first lens with positive refractive power; a second lens with refractive power; and a third lens with refractive power; and at least one of the image-side surface and object-side surface of each of the three lens elements are aspheric. The optical lens can increase aperture value and improve the imaging quality for use in compact cameras.

25 Claims, 18 Drawing Sheets

(51) Int. Cl.
*G02B 9/16* (2006.01)
*G02B 27/00* (2006.01)

(56) References Cited

U.S. PATENT DOCUMENTS

| | | | | |
|---|---|---|---|---|
| 6,977,779 | B2* | 12/2005 | Shinohara | G02B 13/18 |
| | | | | 359/716 |
| 7,145,736 | B2* | 12/2006 | Noda | G02B 9/16 |
| | | | | 359/785 |
| 7,184,225 | B1* | 2/2007 | Noda | G02B 13/0035 |
| | | | | 359/784 |
| 7,199,948 | B1* | 4/2007 | Sato | G02B 13/18 |
| | | | | 359/716 |
| 7,408,725 | B2* | 8/2008 | Sato | G02B 13/18 |
| | | | | 359/716 |
| 7,460,314 | B2* | 12/2008 | Shyu | G02B 13/0035 |
| | | | | 359/708 |
| 7,468,847 | B2* | 12/2008 | Tang | G02B 13/18 |
| | | | | 359/784 |
| 7,599,131 | B2* | 10/2009 | Taniyama | G02B 9/12 |
| | | | | 359/764 |
| 7,738,191 | B2* | 6/2010 | Sato | G02B 13/0035 |
| | | | | 359/716 |
| 7,830,622 | B2* | 11/2010 | Shinohara | G02B 9/12 |
| | | | | 359/716 |
| 7,835,071 | B2* | 11/2010 | Izumi | G02B 27/0037 |
| | | | | 359/356 |
| 8,310,770 | B2* | 11/2012 | Tang | G02B 9/12 |
| | | | | 359/716 |
| 8,395,691 | B2* | 3/2013 | Tang | G02B 13/18 |
| | | | | 359/715 |
| 8,462,448 | B2* | 6/2013 | Shigemitsu | H04N 5/232123 |
| | | | | 359/716 |
| 9,217,844 | B2* | 12/2015 | Liao | G02B 13/0035 |
| 9,638,893 | B2* | 5/2017 | Liu | G02B 13/0035 |
| 9,690,073 | B2* | 6/2017 | Liu | G02B 13/001 |
| 9,709,772 | B2* | 7/2017 | Liu | G02B 13/0035 |
| 9,715,084 | B2* | 7/2017 | Lee | G02B 1/041 |
| 9,726,854 | B2* | 8/2017 | Liu | G02B 13/0035 |
| 9,729,771 | B2* | 8/2017 | Liao | G02B 13/002 |
| 9,753,251 | B2* | 9/2017 | Liu | G02B 13/002 |
| 9,766,432 | B2* | 9/2017 | Liu | G02B 9/16 |
| 9,778,439 | B2* | 10/2017 | Liu | G02B 9/16 |
| 9,784,944 | B2* | 10/2017 | Liao | G02B 13/0035 |
| 9,798,107 | B2* | 10/2017 | Liu | G02B 13/0035 |
| 9,823,441 | B2* | 11/2017 | Liu | G02B 13/0035 |
| 10,007,087 | B2* | 6/2018 | Lai | G02B 9/12 |
| 10,025,065 | B2* | 7/2018 | Liu | G02B 13/0035 |
| 10,031,317 | B2* | 7/2018 | Hsueh | G02B 13/0035 |
| 10,042,142 | B2* | 8/2018 | Lai | G02B 13/0035 |
| 10,048,464 | B2* | 8/2018 | Lai | G02B 27/0025 |
| 10,073,240 | B2* | 9/2018 | Lai | G02B 13/0035 |
| 10,073,241 | B2* | 9/2018 | Lai | G02B 9/16 |
| 10,073,242 | B2* | 9/2018 | Lai | G02B 9/60 |
| 10,114,194 | B2* | 10/2018 | Lai | G02B 9/12 |
| 10,139,593 | B2* | 11/2018 | Lai | G02B 27/646 |
| 10,386,603 | B2* | 8/2019 | Hsueh | G02B 13/0035 |
| 10,429,624 | B2* | 10/2019 | Lai | G02B 9/14 |
| 10,585,262 | B2* | 3/2020 | Hsueh | G02B 13/0035 |
| 10,816,765 | B2* | 10/2020 | Chang | G02B 13/008 |
| 11,163,136 | B2* | 11/2021 | Hsueh | G02B 13/0035 |
| 11,467,376 | B2* | 10/2022 | Yeh | G02B 13/0035 |
| 11,467,377 | B2* | 10/2022 | Chang | G02B 9/34 |
| 2005/0094292 | A1* | 5/2005 | Cahall | G02B 13/004 |
| | | | | 359/785 |
| 2007/0229987 | A1* | 10/2007 | Shinohara | G02B 9/12 |
| | | | | 359/784 |
| 2010/0118416 | A1* | 5/2010 | Do | G02B 13/006 |
| | | | | 359/716 |
| 2010/0165485 | A1* | 7/2010 | Do | G02B 1/00 |
| | | | | 359/716 |
| 2011/0304764 | A1* | 12/2011 | Shigemitsu | G02B 13/0035 |
| | | | | 359/785 |
| 2015/0077868 | A1* | 3/2015 | Liao | G02B 13/0035 |
| | | | | 359/716 |
| 2016/0085051 | A1* | 3/2016 | Lee | G02B 27/0025 |
| | | | | 359/716 |
| 2016/0161710 | A1* | 6/2016 | Liao | G02B 13/0035 |
| | | | | 359/716 |
| 2016/0161711 | A1* | 6/2016 | Liao | G02B 13/0035 |
| | | | | 359/716 |
| 2016/0212309 | A1* | 7/2016 | Liu | G02B 13/0035 |
| 2016/0212310 | A1* | 7/2016 | Liu | G02B 13/002 |
| 2016/0223784 | A1* | 8/2016 | Liu | G02B 13/0035 |
| 2016/0223785 | A1* | 8/2016 | Liu | G02B 13/002 |
| 2016/0223786 | A1* | 8/2016 | Liu | G02B 13/002 |
| 2016/0223787 | A1* | 8/2016 | Liu | G02B 13/0035 |
| 2016/0223788 | A1* | 8/2016 | Liu | G02B 13/0035 |
| 2016/0223789 | A1* | 8/2016 | Liu | G02B 13/0035 |
| 2016/0227082 | A1* | 8/2016 | Hsueh | G02B 13/0035 |
| 2018/0321469 | A1* | 11/2018 | Hsueh | G02B 13/0035 |
| 2019/0324230 | A1* | 10/2019 | Hsueh | G02B 13/0035 |
| 2020/0158992 | A1* | 5/2020 | Hsueh | G02B 13/0035 |
| 2022/0003965 | A1* | 1/2022 | Chang | G02B 9/14 |
| 2022/0019057 | A1* | 1/2022 | Hsueh | G02B 13/0035 |

* cited by examiner

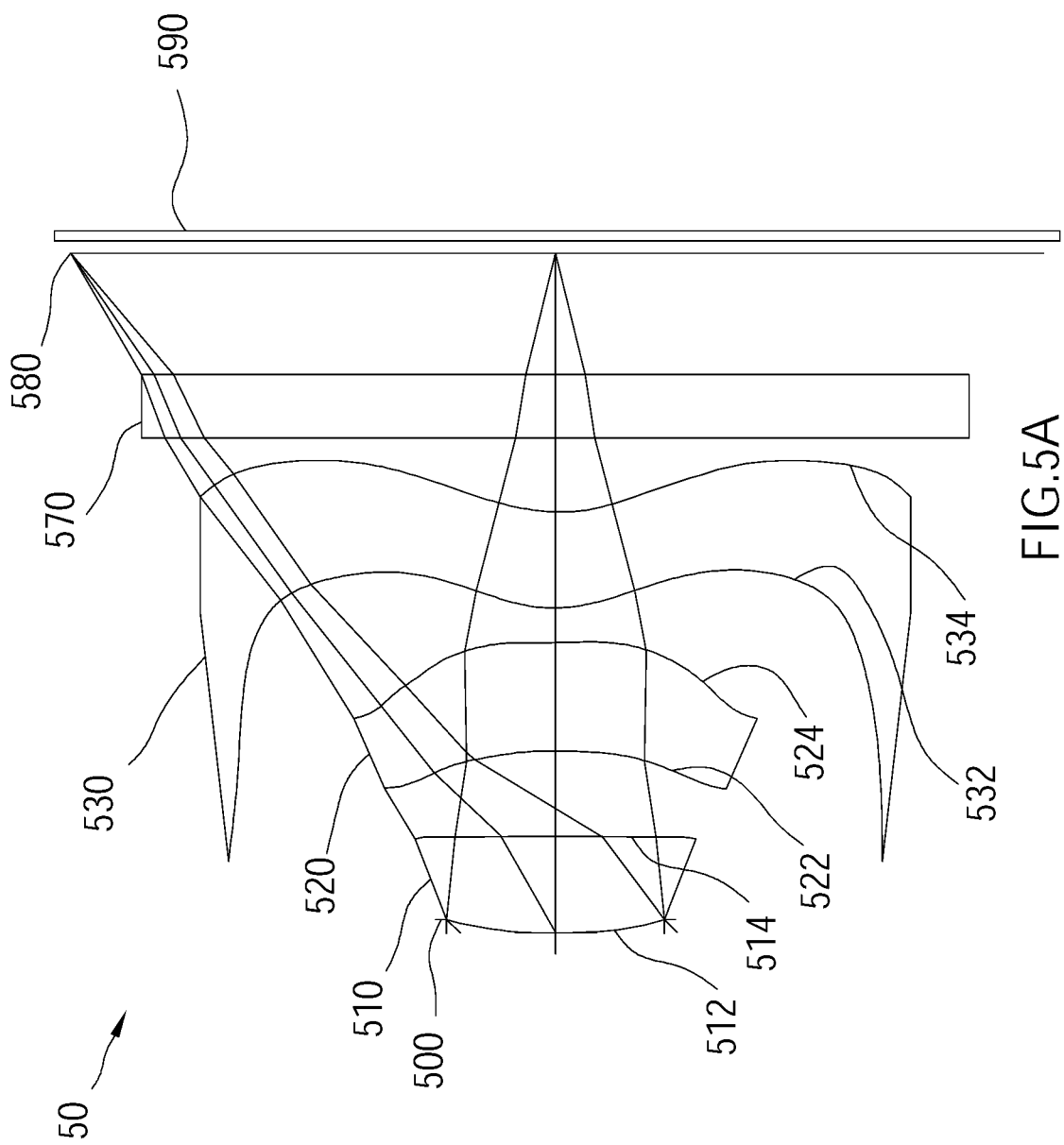

OPTICAL IMAGE CAPTURING SYSTEM

BACKGROUND OF THE INVENTION

Technical Field

The present invention relates generally to an optical system, and more particularly to a compact optical image capturing system for an electronic device.

Description of Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has two lenses. However, the optical system is asked to take pictures in a dark environment, or is asked to provide a wide view angle to satisfy the requirement for taking selfies through the front camera of a portable phone. In other words, the optical system is asked to have a large aperture. However, an optical system having large aperture usually generates aberrations, which causes poor imaging quality at peripheral portions, and also increases the difficulty of manufacturing such an optical system. In addition, an optical system with a wide view angle usually has higher distortion while imaging. The conventional optical system could not provide high optical performance as required.

It is an important issue to increase the amount of light entering the lens, and to widen the view angle of an optical image capturing system. In addition, the modern lens is asked not only to contain more total pixels, to provide higher image quality, but also to balance the requirements for a miniature optical image capturing system.

BRIEF SUMMARY OF THE INVENTION

The aspect of embodiment of the present disclosure directs to an optical image capturing system and an optical image capturing lens which use combination of refractive powers, convex and concave surfaces of three-piece optical lenses (the convex or concave surface in the disclosure denotes the geometrical shape of an image-side surface or an object-side surface of each lens on an optical axis) to increase the amount of incoming light of the optical image capturing system, widen the view angle of the optical image capturing system, and to improve the total pixels contained in an image and the imaging quality for image formation, so as to be applied to minimized electronic products.

The terms and definitions thereof related to the lens parameters in the embodiments of the present invention are shown as below for further reference.

The lens parameter related to a length or a height in the lens:

A height for image formation of the optical image capturing system is denoted by HOI. A height of the optical image capturing system is denoted by HOS. A distance from the object-side surface of the first lens to the image-side surface of the third lens is denoted by InTL. A distance between the image-side surface of the third lens and the image plane is denoted as InB; InTL+InB=HOS; A distance from the first lens to the second lens is denoted by IN12 (as an example). A central thickness of the first lens of the optical image capturing system on the optical axis is denoted by TP1 (as an example).

The lens parameter related to a material in the lens:

An Abbe number of the first lens in the optical image capturing system is denoted by NA1 (as an example). A refractive index of the first lens is denoted by Nd1 (as an example).

The lens parameter related to a view angle in the lens:

A view angle is denoted by AF. Half of the view angle is denoted by HAF.

A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to an arc length of the shape of a surface and a surface profile:

For any surface of any lens, a profile curve length of the maximum effective half diameter is, by definition, measured from a start point where the optical axis of the belonging optical image capturing system passes through the surface of the lens, along a surface profile of the lens, and finally to an end point of the maximum effective half diameter thereof. In other words, the curve length between the aforementioned start and end points is the profile curve length of the maximum effective half diameter, which is denoted by ARS. For example, the profile curve length of the maximum effective half diameter of the object-side surface of the first lens is denoted by ARS11, the profile curve length of the maximum effective half diameter of the image-side surface of the first lens is denoted by ARS12, the profile curve length of the maximum effective half diameter of the object-side surface of the second lens is denoted by ARS21, the profile curve length of the maximum effective half diameter of the image-side surface of the second lens is denoted by ARS22, and so on.

For any surface of any lens, a profile curve length of a half of the entrance pupil diameter (HEP) is, by definition, measured from a start point where the optical axis of the belonging optical image capturing system passes through the surface of the lens, along a surface profile of the lens, and finally to a coordinate point of a perpendicular distance where is a half of the entrance pupil diameter away from the optical axis. In other words, the curve length between the aforementioned stat point and the coordinate point is the profile curve length of a half of the entrance pupil diameter (HEP), and is denoted by ARE. For example, the profile curve length of a half of the entrance pupil diameter (HEP) of the object-side surface of the first lens is denoted by ARE11, the profile curve length of a half of the entrance pupil diameter (HEP) of the image-side surface of the first lens is denoted by ARE12, the profile curve length of a half of the entrance pupil diameter (HEP) of the object-side surface of the second lens is denoted by ARE21, the profile curve length of a half of the entrance pupil diameter (HEP) of the image-side surface of the second lens is denoted by ARE22, and so on.

The lens parameter related to a depth of the lens shape:

A displacement from a point on the object-side surface of the third lens, which is passed through by the optical axis, to a point on the optical axis, where a projection of the maximum effective semi diameter of the object-side surface of the third lens ends, is denoted by InRS31 (as an example). A displacement from a point on the image-side surface of the third lens, which is passed through by the optical axis, to a point on the optical axis, where a projection of the maximum effective semi diameter of the image-side surface of the third lens ends, is denoted by InRS32 (as an example).

The lens parameter related to the lens shape:

A critical point C is a tangent point on a surface of a specific lens, and the tangent point is tangent to a plane perpendicular to the optical axis and the tangent point cannot be a crossover point on the optical axis. By the definition, a distance perpendicular to the optical axis between a critical point C21 on the object-side surface of the second lens and the optical axis is denoted by HVT21 (as an example), and a distance perpendicular to the optical axis between a critical point C22 on the image-side surface of the second lens and the optical axis is denoted by HVT22 (as an example). A distance perpendicular to the optical axis between a critical point C31 on the object-side surface of the third lens and the optical axis is denoted by HVT31 (as an example), and a distance perpendicular to the optical axis between a critical point C32 on the image-side surface of the third lens and the optical axis is denoted by HVT32 (as an example). A distance perpendicular to the optical axis between a critical point on the object-side or image-side surface of other lenses the optical axis is denoted in the same manner.

The object-side surface of the third lens has one inflection point IF311 which is nearest to the optical axis, and the sinkage value of the inflection point IF311 is denoted by SGI311 (as an example). A distance perpendicular to the optical axis between the inflection point IF311 and the optical axis is HIF311 (as an example). The image-side surface of the third lens has one inflection point IF321 which is nearest to the optical axis, and the sinkage value of the inflection point IF321 is denoted by SGI321 (as an example). A distance perpendicular to the optical axis between the inflection point IF321 and the optical axis is HIF321 (as an example).

The object-side surface of the third lens has one inflection point IF312 which is the second nearest to the optical axis, and the sinkage value of the inflection point IF312 is denoted by SGI312 (as an example). A distance perpendicular to the optical axis between the inflection point IF312 and the optical axis is HIF312 (as an example). The image-side surface of the third lens has one inflection point IF322 which is the second nearest to the optical axis, and the sinkage value of the inflection point IF322 is denoted by SGI322 (as an example). A distance perpendicular to the optical axis between the inflection point IF322 and the optical axis is HIF322 (as an example).

The object-side surface of the third lens has one inflection point IF313 which is the third nearest to the optical axis, and the sinkage value of the inflection point IF313 is denoted by SGI313 (as an example). A distance perpendicular to the optical axis between the inflection point IF313 and the optical axis is HIF313 (as an example). The image-side surface of the third lens has one inflection point IF323 which is the third nearest to the optical axis, and the sinkage value of the inflection point IF323 is denoted by SGI323 (as an example). A distance perpendicular to the optical axis between the inflection point IF323 and the optical axis is HIF323 (as an example).

The object-side surface of the third lens has one inflection point IF314 which is the fourth nearest to the optical axis, and the sinkage value of the inflection point IF314 is denoted by SGI314 (as an example). A distance perpendicular to the optical axis between the inflection point IF314 and the optical axis is HIF314 (as an example). The image-side surface of the third lens has one inflection point IF324 which is the fourth nearest to the optical axis, and the sinkage value of the inflection point IF324 is denoted by SGI324 (as an example). A distance perpendicular to the optical axis between the inflection point IF324 and the optical axis is HIF324 (as an example).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

Transverse aberration on an edge of an aperture is denoted by STA, which stands for STOP transverse aberration, and is used to evaluate the performance of one specific optical image capturing system. The transverse aberration of light in any field of view can be calculated with a tangential fan or a sagittal fan. More specifically, the transverse aberration caused when the longest operation wavelength (e.g., 650 nm) and the shortest operation wavelength (e.g., 470 nm) pass through the edge of the aperture can be used as the reference for evaluating performance. The coordinate directions of the aforementioned tangential fan can be further divided into a positive direction (upper light) and a negative direction (lower light). The longest operation wavelength which passes through the edge of the aperture has an imaging position on the image plane in a particular field of view, and the reference wavelength of the mail light (e.g., 555 nm) has another imaging position on the image plane in the same field of view. The transverse aberration caused when the longest operation wavelength passes through the edge of the aperture is defined as a distance between these two imaging positions. Similarly, the shortest operation wavelength which passes through the edge of the aperture has an imaging position on the image plane in a particular field of view, and the transverse aberration caused when the shortest operation wavelength passes through the edge of the aperture is defined as a distance between the imaging position of the shortest operation wavelength and the imaging position of the reference wavelength. The performance of the optical image capturing system can be considered excellent if the transverse aberrations of the shortest and the longest operation wavelength which pass through the edge of the aperture and image on the image plane in 0.7 field of view (i.e., 0.7 times the height for image formation HOT) are both less than 100 μm. Furthermore, for a stricter evaluation, the performance cannot be considered excellent unless the transverse aberrations of the shortest and the longest operation wavelength which pass through the edge of the aperture and image on the image plane in 0.7 field of view are both less than 80 μm.

The optical image capturing system has a maximum image height HOI on the image plane vertical to the optical axis. A transverse aberration at 0.7 HOI in the positive direction of the tangential fan after the longest operation wavelength passing through the edge of the aperture is denoted by PLTA for visible light; a transverse aberration at 0.7 HOI in the positive direction of the tangential fan after the shortest operation wavelength passing through the edge of the aperture is denoted by PSTA for visible light; a transverse aberration at 0.7 HOI in the negative direction of the tangential fan after the longest operation wavelength passing through the edge of the aperture is denoted by NLTA for visible light; a transverse aberration at 0.7 HOI in the negative direction of the tangential fan after the shortest operation wavelength passing through the edge of the aperture is denoted by NSTA for visible light; a transverse aberration at 0.7 HOI of the sagittal fan after the longest operation wavelength passing through the edge of the aperture is denoted by SLTA for visible light; a transverse aberration at 0.7 HOI of the sagittal fan after the shortest operation wavelength passing through the edge of the aperture is denoted by SSTA for visible light.

The present invention provides an optical image capturing system, in which the third lens is provided with an inflection point at the object-side surface or at the image-side surface to adjust the incident angle of each view field and modify the ODT and the TDT. In addition, the surfaces of the third lens are capable of modifying the optical path to improve the imagining quality.

The optical image capturing system of the present invention includes a first lens, a second lens, a third lens, and an image plane in order along an optical axis from an object side to an image side. The first lens has refractive power. The optical image capturing system satisfies:

$1 \le f/HEP \le 10$; $0 \deg < HAF \le 50 \deg$ and $0.9 \le 2(ARE/HEP) \le 2.0$;

where f is a focal length of the optical image capturing system; HEP is an entrance pupil diameter of the optical image capturing system; HOS is a distance between an object-side surface on the optical axis, which face the object side, of the first lens and the image plane; InTL is a distance between the object-side surface of the first lens and the image-side surface of the third lens on the optical axis; HAF is a half of a maximum view angle of the optical image capturing system; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, and an image plane in order along an optical axis from an object side to an image side. The optical image capturing system consists of the three lenses having refractive power. At least one lens among the first lens to the third lens have at least an inflection point on at least a surface thereof. At least one lens between the second lens and the third lens has positive refractive power. The optical image capturing system satisfies:

$1 \le f/HEP \le 10$; $0 \deg < HAF \le 50 \deg$; and $0.9 \le 2(ARE/HEP) \le 2.0$;

where f is a focal length of the optical image capturing system; HEP is an entrance pupil diameter of the optical image capturing system; HOS is a distance between an object-side surface, which face the object side, of the first lens and the image plane on the optical axis; InTL is a distance between the object-side surface of the first lens and the image-side surface of the third lens on the optical axis; HAF is a half of a maximum view angle of the optical image capturing system; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, and an image plane, in order along an optical axis from an object side to an image side. The number of the lenses having refractive power in the optical image capturing system is three. Each of at least one lens among the first to the third lenses has at least an inflection point on at least one surface thereof. The optical image capturing system satisfies:

$1 \le f/HEP \le 10$; $10 \deg < HAF \le 50 \deg$ and $0.9 \le 2(ARE/HEP) \le 2.0$;

where f is a focal length of the optical image capturing system; HEP is an entrance pupil diameter of the optical image capturing system; HOS is a distance between an object-side surface, which face the object side, of the first lens and the image plane on the optical axis; InTL is a distance between the object-side surface of the first lens and the image-side surface of the third lens on the optical axis; HAF is a half of a maximum view angle of the optical image capturing system; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

For any surface of any lens, the profile curve length within the effective half diameter affects the ability of the surface to correct aberration and differences between optical paths of light in different fields of view. With longer profile curve length, the ability to correct aberration is better. However, the difficulty of manufacturing increases as well. Therefore, the profile curve length within the effective half diameter of any surface of any lens has to be controlled. The ratio between the profile curve length (ARS) within the effective half diameter of one surface and the thickness (TP) of the lens, which the surface belonged to, on the optical axis (i.e., ARS/TP) has to be particularly controlled. For example, the profile curve length of the maximum effective half diameter of the object-side surface of the first lens is denoted by ARS11, the thickness of the first lens on the optical axis is TP1, and the ratio between these two parameters is ARS11/TP1; the profile curve length of the maximum effective half diameter of the image-side surface of the first lens is denoted by ARS12, and the ratio between ARS12 and TP1 is ARS12/TP1. The profile curve length of the maximum effective half diameter of the object-side surface of the second lens is denoted by ARS21, the thickness of the second lens on the optical axis is TP2, and the ratio between these two parameters is ARS21/TP2; the profile curve length of the maximum effective half diameter of the image-side surface of the second lens is denoted by ARS22, and the ratio between ARS22 and TP2 is ARS22/TP2. For any surface of other lenses in the optical image capturing system, the ratio between the profile curve length of the maximum effective half diameter thereof and the thickness of the lens which the surface belonged to is denoted in the same manner.

For any surface of any lens, the profile curve length within a half of the entrance pupil diameter (HEP) affects the ability of the surface to correct aberration and differences between optical paths of light in different fields of view. With longer profile curve length, the ability to correct aberration is better. However, the difficulty of manufacturing increases as well. Therefore, the profile curve length within a half of the entrance pupil diameter (HEP) of any surface of any lens has to be controlled. The ratio between the profile curve length (ARE) within a half of the entrance pupil diameter (HEP) of one surface and the thickness (TP) of the lens, which the surface belonged to, on the optical axis (i.e., ARE/TP) has to be particularly controlled. For example, the profile curve length of a half of the entrance pupil diameter (HEP) of the object-side surface of the first lens is denoted by ARE11, the thickness of the first lens on the optical axis is TP1, and the ratio between these two parameters is ARE11/TP1; the profile curve length of a half of the entrance pupil diameter (HEP) of the image-side surface of the first lens is denoted by ARE12, and the ratio between ARE12 and TP1 is ARE12/TP1. The profile curve length of a half of the entrance pupil diameter (HEP) of the object-side surface of the second lens is denoted by ARE21, the thickness of the second lens on the optical axis is TP2, and the ratio between these two parameters is ARE21/TP2; the profile curve length of a half of the entrance pupil diameter (HEP) of the image-side surface of the second lens is denoted by ARE22, and the ratio between ARE22 and TP2 is ARE22/TP2. For any surface of other lenses in the optical image capturing system, the ratio between the profile curve length of a half of the entrance pupil diameter (HEP) thereof and the thickness of the lens which the surface belonged to is denoted in the same manner.

The optical image capturing system could be applied with an image sensor of which the image size is less than 1/1.2 inches in diagonal. Pixel size of said image sensor is less than 1.4 μm, which is preferred to be less than 1.12 μm, and is most preferred to be less than 0.9 μm. In addition, the optical image capturing system would be compatible with an image sensor of which aspect ratio is 16:9.

Said optical image capturing system could meet the requirement for recording megapixel videos, and could provide good image quality.

In an embodiment, a height of the optical image capturing system (HOS) can be reduced while |f1|>f3.

In an embodiment, the second lens could have weak positive refractive power or weak negative refractive power when |f2|>|f1|. When the second lens has weak positive refractive power, it may share the positive refractive power of the first lens, and on the contrary, when the second lens has weak negative refractive power, it may fine turn and correct the aberration of the system.

In an embodiment, the third lens could have positive refractive power, and an image-side surface thereof is concave, it may reduce back focal length and size. Besides, the third lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 5A is a schematic diagram of a fifth embodiment of the present invention;

DETAILED DESCRIPTION OF THE INVENTION

Figure 1A:
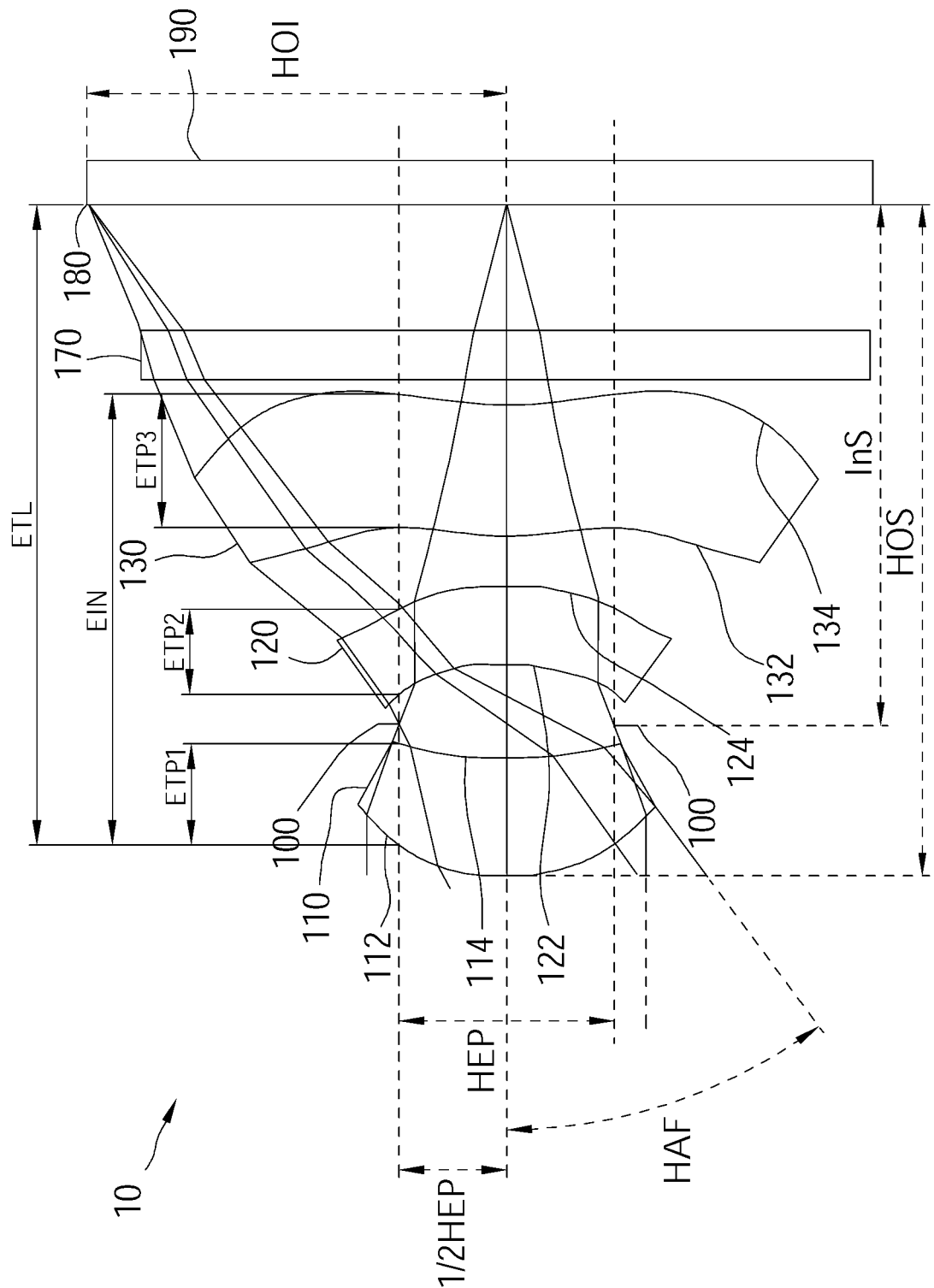
FIG. 1A is a schematic diagram of a first embodiment of the present invention.

An optical image capturing system of the present invention includes a first lens, a second lens, and a third lens from an object side to an image side. The optical image capturing system further is provided with an image sensor at an image plane.

The optical image capturing system can also work in five wavelengths, including 470 nm, 510 nm, 555 nm, 610 nm, and 650 nm wherein 555 nm is the main reference wavelength, and is the reference wavelength for obtaining the technical characters. Referring to obtaining the values of lateral aberration while the longest operation wavelength and the shortest operation wavelength passing through the margin of the aperture, the longest operation wavelength is set as 650 nm, the main wavelength of light of the reference wavelength is set as 555 nm, and the shortest operation wavelength is set as 470 nm.

The optical image capturing system of the present invention satisfies $0.5 \leq \Sigma PPR/|\Sigma NPR| \leq 4.5$, and a preferable range is $1 \leq \Sigma PPR/\Sigma|NPR| \leq 3.8$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; ΣPPR is a sum of the PPRs of each positive lens; and/NPR is a sum of the NPRs of each negative lens. It is helpful for control of an entire refractive power and an entire length of the optical image capturing system.

The height of the optical image capturing system is denoted by HOS. When HOS/f is close to 1, it would help to manufacture a miniaturized optical image capturing system capable of providing images of hyper-rich pixels.

A sum of the focal lengths fp of each lens with positive refractive power in the optical image capturing system is denoted by ΣPP, while a sum of each lens with negative refractive power in the optical image capturing system is denoted by/NP. In an embodiment, the optical image capturing system satisfies the condition: $0<\Sigma PP \leq 200$; and $f1/\Sigma PP \leq 0.85$. Whereby, the focusing ability of the optical image capturing system could be controlled. Furthermore, the positive refractive power of the system could be properly distributed to suppress obvious aberration from happening too early. The first lens has positive refractive power, and an object-side surface thereof could be convex. Whereby, the strength of the positive refractive power of the first lens could be properly adjusted, which helps to shorten a total length of the optical image capturing system.

The second lens could have negative refractive power, which helps to compensate the aberration generated by the first lens.

The third lens could have positive refractive power, and an image-side surface thereof could be concave. Whereby, the positive refractive power of the first lens could be shard, and it would help to shorten the rear focal length to maintain miniature. In addition, at least a surface of third lens could have at least an inflection point, which could effectively suppress the incidence angle of light in the off-axis field of view, and further correct the aberration in the off-axis field of view. Preferably, an object-side surface and the image-side surface thereof both have at least an inflection point.

The image sensor is provided on the image plane. The optical image capturing system of the present invention satisfies HOS/HOI≤3 and 0.5≤HOS/f≤3.0, and a preferable range is 1≤HOS/HOI≤2.5 and 1≤HOS/f≤2, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies 0.5≤InS/HOS≤1.1, where InS is a distance between the aperture and the image plane. Preferably, the optical image capturing system satisfies 0.6≤InS/HOS≤1. It is helpful for size reduction and wide angle.

The optical image capturing system of the present invention satisfies 0.45≤ΣTP/InTL≤0.95, where InTL is a distance between the object-side surface of the first lens and the image-side surface of the third lens, and ΣTP is a sum of central thicknesses of the lenses on the optical axis. It is helpful for the contrast of image and yield rate of manufacture and provides a suitable back focal length for installation of other elements.

The optical image capturing system of the present invention satisfies 0.1≤|R1/R2|≤3.0, and a preferable range is 0.1≤|R1/R2|≤2.0, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies −200<(R5−R6)/(R5+R6)<30, where R5 is a radius of curvature of the object-side surface of the third lens, and R6 is a radius of curvature of the image-side surface of the third lens. It may modify the astigmatic field curvature.

The optical image capturing system of the present invention satisfies 0<IN12/f≤0.30, where IN12 is a distance on the optical axis between the first lens and the second lens. Preferably, the optical image capturing system satisfies 0.01≤IN12/f≤0.2.5 It may correct chromatic aberration and improve the performance.

The optical image capturing system of the present invention satisfies IN23/f≤0.25, where IN23 is a distance on the optical axis between the second lens and the third lens. It may correct chromatic aberration and improve the performance.

The optical image capturing system of the present invention satisfies 2≤(TP1+IN12)/TP2≤10, where TP1 is a central thickness of the first lens on the optical axis, and TP2 is a central thickness of the second lens on the optical axis. It may control the sensitivity of manufacture of the system and improve the performance.

The optical image capturing system of the present invention satisfies $1.0 \leq (TP3+IN23)/TP2 \leq 10$, where TP3 is a central thickness of the third lens on the optical axis, and IN23 is a distance between the second lens and the third lens. It may control the sensitivity of manufacture of the system and improve the performance.

The optical image capturing system of the present invention satisfies $0.1 \leq TP1/TP2 \leq 0.6$; $0.1 \leq TP2/TP3 \leq 0.6$. It may fine tune and correct the aberration of the incident rays layer by layer, and reduce the height of the system.

The optical image capturing system 10 of the first embodiment further satisfies $-1$ mm$\leq$InRS31$\leq$1 mm; $-1$ mm$\leq$InRS32$\leq$1 mm; 1 mm$\leq$|InRS31|+|InRS32|$\leq$2 mm; $0.01 \leq$|InRS31|/TP3$\leq$10; $0.01 \leq$|InRS32|/TP3$\leq$10, where InRS31 is a displacement from a point on the object-side surface of the third lens, which is passed through by the optical axis, to a point on the optical axis, where a projection of the maximum effective semi diameter of the object-side surface of the third lens ends (if the displacement on the optical axis moves towards the image side, then InRS31 is a positive value; if the displacement on the optical axis moves towards the object side, then InRS31 is a negative value); InRS32 is a displacement from a point on the image-side surface of the third lens, which is passed through by the optical axis, to a point on the optical axis, where a projection of the maximum effective semi diameter of the image-side surface of the third lens ends; and TP3 is a central thickness of the third lens on the optical axis. Whereby, a location of the maximum effective semi diameter between two surfaces of the third lens could be controlled, which helps to correct the aberration of the peripheral view field of the optical image capturing system, and to maintain miniature.

The optical image capturing system of the present invention satisfies $0 < SGI311/(SGI311+TP3) \leq 0.9$; $0 < SGI321/(SGI321+TP3) \leq 0.9$, and it is preferable to satisfy $0.01 < SGI311/(SGI311+TP3) \leq 0.7$; $0.01 < SGI321/(SGI321+TP3) \leq 0.7$, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

The optical image capturing system of the present invention satisfies $0 \leq SGI312/(SGI312+TP3) \leq 0.9$; $0 < SGI322/(SGI322+TP3) \leq 0.9$, and it is preferable to satisfy $0.1 \leq SGI312/(SGI312+TP3) \leq 0.8$; $0.1 \leq SGI322/(SGI322+TP3) \leq 0.8$, where SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the image-side surface, which is the second closest to the optical axis.

The optical image capturing system of the present invention satisfies $0.01 \leq$HIF311/HOI$\leq 0.9$; $0.01 \leq$HIF321/HOI$\leq 0.9$, and it is preferable to satisfy $0.09 \leq$HIF311/HOI$\leq 0.5$; $0.09 \leq$HIF321/HOI $\leq 0.5$, where HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

The optical image capturing system of the present invention satisfies $0.01 \leq$HIF312/HOI$\leq 0.9$; $0.01 \leq$HIF322/HOI$\leq 0.9$, and it is preferable to satisfy $0.09 \leq$HIF312/HOI$\leq 0.8$; $0.09 \leq$HIF322/HOI $\leq 0.8$, where HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The optical image capturing system of the present invention satisfies $0.001$ mm$\leq$|HIF313|$\leq$5 mm; $0.001$ mm$\leq$|HIF323|$\leq$5 mm, and it is preferable to satisfy $0.1$ mm$\leq$|HIF323|$\leq$3.5 mm; $0.1$ mm$\leq$|HIF313|$\leq$3.5 mm, where HIF313 is a distance perpendicular to the optical axis between the inflection point on the object-side surface of the third lens, which is the third closest to the optical axis, and the optical axis; HIF323 is a distance perpendicular to the optical axis between the inflection point on the image-side surface of the third lens, which is the third closest to the optical axis, and the optical axis.

The optical image capturing system of the present invention satisfies $0.001$ mm$\leq$|HIF314|$\leq$5 mm; $0.001$ mm$\leq$|HIF324|$\leq$5 mm, and it is preferable to satisfy $0.1$ mm$\leq$|HIF324|$\leq$3.5 mm; $0.1$ mm$\leq$|HIF314|$\leq$3.5 mm, where HIF314 is a distance perpendicular to the optical axis between the inflection point on the object-side surface of the third lens, which is the fourth closest to the optical axis, and the optical axis; HIF324 is a distance perpendicular to the optical axis between the inflection point on the image-side surface of the third lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the third lenses could be aspheric that can obtain more control parameters to reduce aberration. The number of aspheric glass lenses could be less than the conventional spherical glass lenses, which is helpful for reduction of the height of the system.

When the lens has a convex surface, which means that the surface is convex around a position, through which the optical axis passes, and when the lens has a concave surface, which means that the surface is concave around a position, through which the optical axis passes.

In addition, the optical image capturing system of the present invention could be further provided with at least an stop as required, which could reduce stray light to improve the imaging quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the third lens of the optical image capturing system of the present invention can be a light filter, which filters out light of wavelength shorter than 500 nm. Such effect can be achieved by coating on at least one surface of the lens, or by using materials capable of filtering out short waves to make the lens.

To meet different requirements, the image plane of the optical image capturing system in the present invention can be either flat or curved. If the image plane is curved (e.g., a sphere with a radius of curvature), the incidence angle required for focusing light on the image plane can be decreased, which is not only helpful to shorten the length of the system (TTL), but also helpful to increase the relative illuminance.

We provide several embodiments in conjunction with the accompanying drawings for the best understanding, which are:

First Embodiment

Figure 1B:
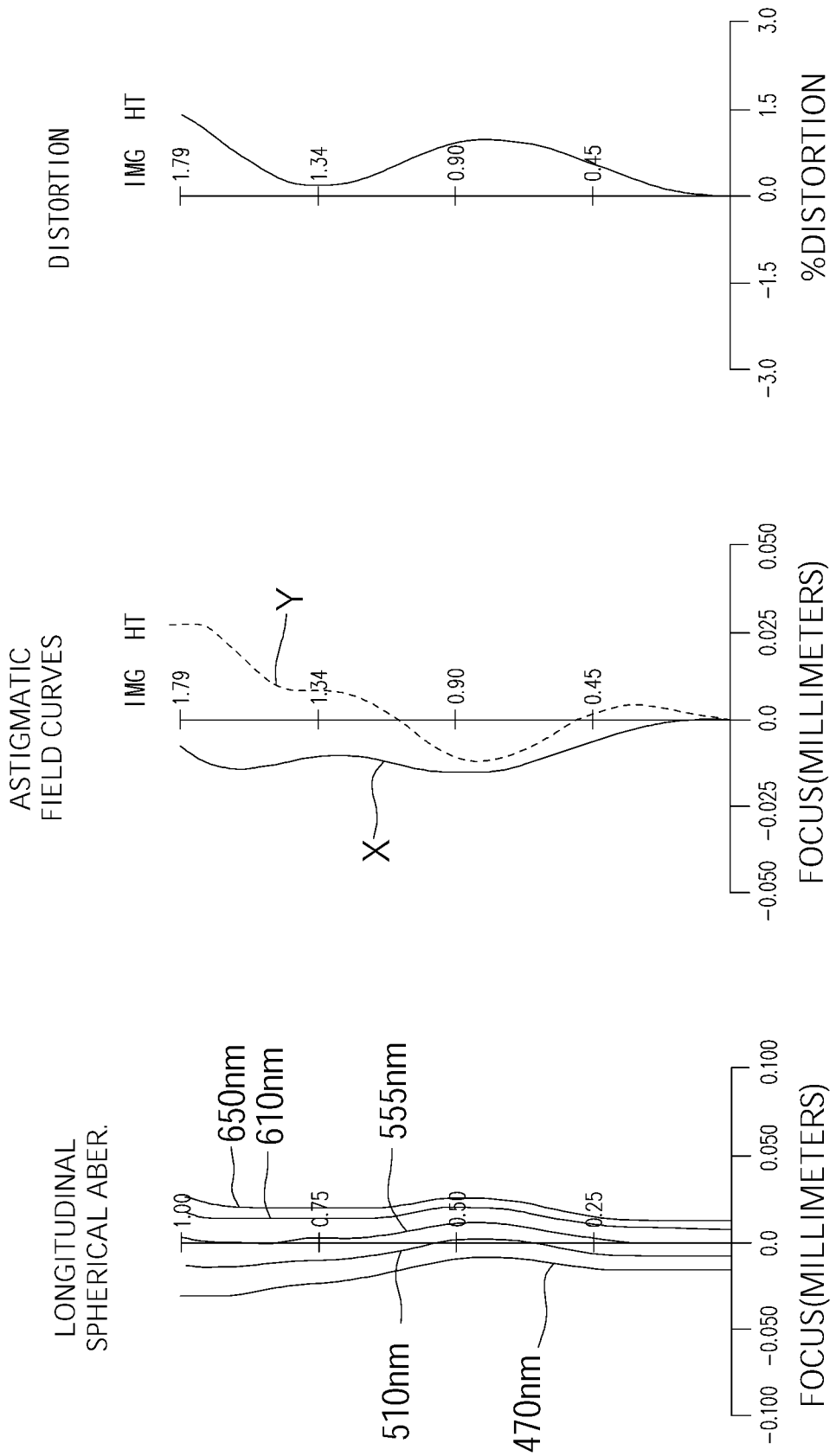
FIG. 1B shows curve diagrams of longitudinal spherical aberration, astigmatic field, and optical distortion of the optical image capturing system in the order from left to right of the first embodiment of the present application.
Figure 1C:
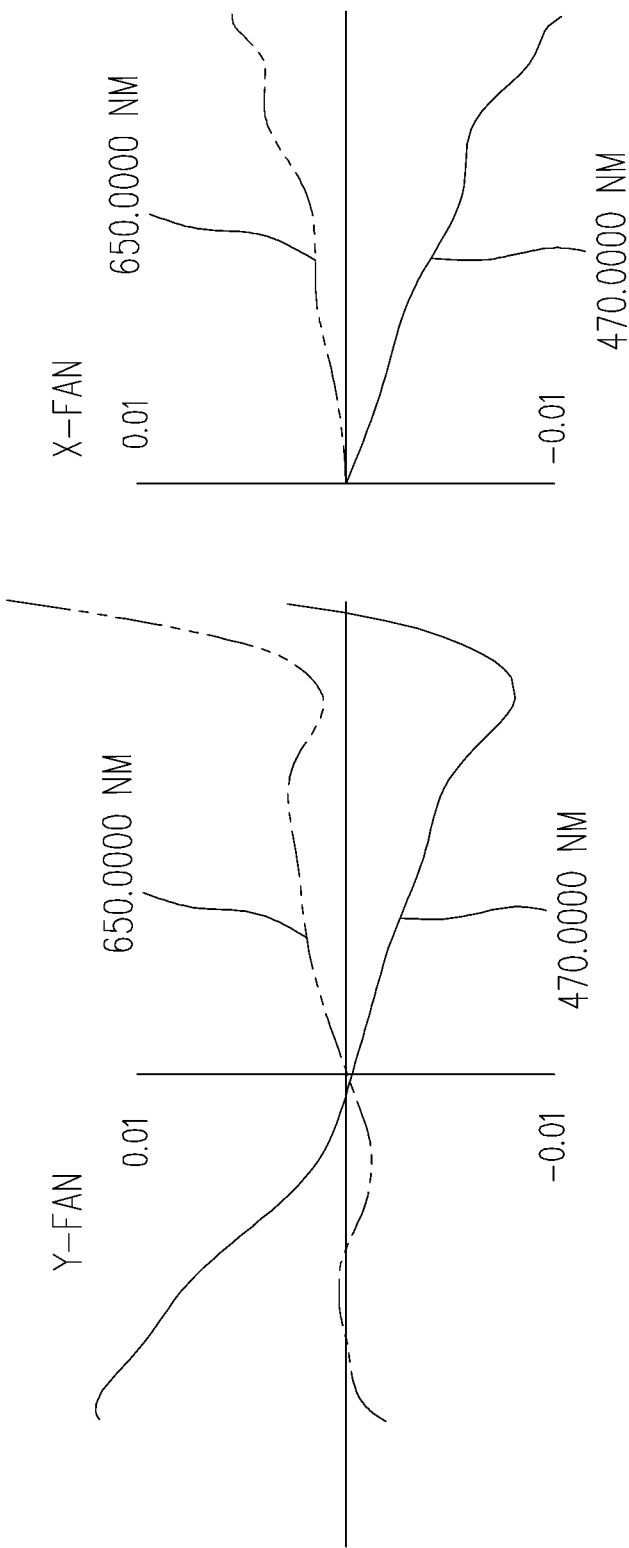
FIG. 1C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, an infrared rays filter 170, an image plane 180, and an image sensor 190. FIG. 1C shows a tangential fan and a sagittal fan of the optical image capturing system 10 of the first embodiment of the present application, and a transverse aberration diagram at 0.7 field of view when a longest operation wavelength and a shortest operation wavelength pass through an edge of the aperture 100.

The first lens 110 has positive refractive power and is made of plastic. An object-side surface 112 thereof, which faces the object side, is a convex aspheric surface, and an image-side surface 114 thereof, which faces the image side, is a concave aspheric surface. A profile curve length of the maximum effective half diameter of an object-side surface of the first lens 110 is denoted by ARS11, and a profile curve length of the maximum effective half diameter of the image-side surface of the first lens 110 is denoted by ARS12. A profile curve length of a half of an entrance pupil diameter (HEP) of the object-side surface of the first lens 110 is denoted by ARE11, and a profile curve length of a half of the entrance pupil diameter (HEP) of the image-side surface of the first lens 110 is denoted by ARE12. A thickness of the first lens 110 on the optical axis is TP1.

The second lens 120 has negative refractive power and is made of plastic. An object-side surface 122 thereof, which faces the object side, is a concave aspheric surface, and an image-side surface 124 thereof, which faces the image side, is a convex aspheric surface. The image-side surface 124 has an inflection point. The second lens satisfies SGI221=−0.1526 mm; |SGI221|/(|SGI221|+TP2)=0.2292, where SGI221 is a displacement in parallel with the optical axis from a point on the image-side surface of the second lens, through which the optical axis passes, to the inflection point on the image-side surface closest to the optical axis. A profile curve length of the maximum effective half diameter of an object-side surface of the second lens 120 is denoted by ARS21, and a profile curve length of the maximum effective half diameter of the image-side surface of the second lens 120 is denoted by ARS22. A profile curve length of a half of an entrance pupil diameter (HEP) of the object-side surface of the second lens 120 is denoted by ARE21, and a profile curve length of a half of the entrance pupil diameter (HEP) of the image-side surface of the second lens 120 is denoted by ARS22. A thickness of the second lens 120 on the optical axis is TP2.

The second lens satisfies HIF221=0.5606 mm; HIF221/HOI=0.3128, where a displacement perpendicular to the optical axis from a point on the image-side surface of the second lens, through which the optical axis passes, to the inflection point closest to the optical axis is denoted by HIF221.

The third lens 130 has positive refractive power and is made of plastic. An object-side surface 132, which faces the object side, is a convex aspheric surface, and an image-side surface 134, which faces the image side, is a concave aspheric surface. The object-side surface 132 has two inflection points, and the image-side surface 134 has an inflection point. The third lens 130 satisfies SGI311=0.0180 mm; SGI321=0.0331 mm; |SGI311|/(|SGI311|+TP3)=0.0339; |SGI321|/(|SGI321|+TP3)=0.0605, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis. A profile curve length of the maximum effective half diameter of an object-side surface of the third lens 130 is denoted by ARS31, and a profile curve length of the maximum effective half diameter of the image-side surface of the third lens 130 is denoted by ARS32. A profile curve length of a half of an entrance pupil diameter (HEP) of the object-side surface of the third lens 130 is denoted by ARE31, and a profile curve length of a half of the entrance pupil diameter (HEP) of the image-side surface of the third lens 130 is denoted by ARE32. A thickness of the third lens 130 on the optical axis is TP3.

The third lens 130 satisfies SGI312=−0.0367 mm; |SGI312|/(|SGI312|+TP3)=0.0668, where SGI312 is a displacement in parallel with the optical axis, from a point on the object-side surface of the third lens, through which the optical axis passes, to the inflection point on the object-side surface second closest to the optical axis.

The third lens 130 further satisfies HIF311=0.2298 mm; HIF321=0.3393 mm; HIF311/HOI=0.1282; HIF321/HOI=0.1893, where HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

The third lens 130 satisfies HIF312=0.8186 mm; HIF312/HOI=0.4568, where HIF312 is a distance perpendicular to the optical axis between the inflection point on the object-side surface of the third lens second closest to the optical axis and the optical axis.

The infrared rays filter 170 is made of glass and between the third lens 130 and the image plane 180. The infrared rays filter 170 gives no contribution to the focal length of the system.

The optical image capturing system 10 of the first embodiment has the following parameters, which are f=2.42952 mm; f/HEP=2.02; and HAF=35.87 degrees; and tan(HAF)=0.7231, where f is a focal length of the system; HAF is a half of the maximum field angle; and HEP is an entrance pupil diameter.

The parameters of the lenses of the first embodiment are f1=2.27233 mm; |f/f1|=1.0692; f3=7.0647 mm; f3; and |f1/f3|=0.3216, where f1 is a focal length of the first lens 110; and f3 is a focal length of the third lens 130.

The first embodiment further satisfies f2=−5.2251 mm; and |f2|>|f1|, where f2 is a focal length of the second lens 120, and f3 is a focal length of the third lens 130.

The optical image capturing system 10 of the first embodiment further satisfies ΣPPR=f/f1+f/f3=1.4131; ΣNPR=f/f2=0.4650; ΣPP/|ΣNPR|=3.0391; |f/f3|=0.3439; |f1/f2|=0.4349; |f2/f3|=0.7396, where PPR is a ratio of a focal length f of the optical image capturing system to a focal length fp of each of the lenses with positive refractive power; and NPR is a ratio of a focal length fn of the optical image capturing system to a focal length fn of each of lenses with negative refractive power.

The optical image capturing system 10 of the first embodiment further satisfies InTL+InB=HOS; HOS=2.9110 mm; HOI=1.792 mm; HOS/HOI=1.6244; HOS/f=1.1982; InTL/HOS=0.7008; InS=2.25447 mm; and InS/HOS=0.7745, where InTL is a distance between the object-side surface 112 of the first lens 110 and the image-side surface 134 of the third lens 130; HOS is a height of the image capturing system, i.e. a distance between the object-side surface 112 of the first lens 110 and the image plane 180; InS is a distance between the aperture 100 and the image plane 180; HOI is a half of a diagonal of an effective sensing area of the image sensor 190, i.e., the maximum image height; and InB is a distance between the image-side surface 134 of the third lens 130 and the image plane 180.

The optical image capturing system 10 of the first embodiment further satisfies ΣTP=1.4198 mm; and ΣTP/InTL=0.6959, where ΣTP is a sum of the thicknesses of the lenses 110-130 with refractive power. It is helpful for the contrast of image and yield rate of manufacture and provides a suitable back focal length for installation of other elements.

The optical image capturing system 10 of the first embodiment further satisfies |R1/R2|=0.3849, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R5−R6)/(R5+R6)=−0.0899, where R5 is a radius of curvature of the object-side surface 132 of the third lens 130, and R6 is a radius of curvature of the image-side surface 134 of the third lens 130. It may modify the astigmatic field curvature.

The optical image capturing system 10 of the first embodiment further satisfies ΣPP=f1+f3=9.3370 mm; and f1/(f1+f3)=0.2434, where ΣPP is a sum of the focal lengths fp of each lens with positive refractive power. It is helpful to share the positive refractive power of the first lens 110 to the other positive lens to avoid the significant aberration caused by the incident rays.

The optical image capturing system 10 of the first embodiment further satisfies ΣNP=f2=−5.2251 mm, where ΣNP is a sum of the focal length fn of each lens with negative refractive power. It is helpful to avoid the significant aberration caused by the incident rays.

The optical image capturing system 10 of the first embodiment further satisfies IN12=0.4068 mm; IN12/f=0.1674, where IN12 is a distance on the optical axis between the first lens 110 and the second lens 120. It may correct chromatic aberration and improve the performance.

The optical image capturing system 10 of the first embodiment further satisfies TP1=0.5132 mm; TP2=0.3363 mm; and (TP1+IN12)/TP2=2.7359, where TP1 is a central thickness of the first lens 110 on the optical axis, and TP2 is a central thickness of the second lens 120 on the optical axis. It may control the sensitivity of manufacture of the system and improve the performance.

The optical image capturing system 10 of the first embodiment further satisfies (TP3+IN23)/TP2=2.3308, where TP3 is a central thickness of the third lens 130 on the optical axis, and IN23 is a distance on the optical axis between the first lens 110 and the second lens 120. It may control the sensitivity of manufacture of the system and lower the total height of the system.

The optical image capturing system 10 of the first embodiment further satisfies TP2/(IN12+TP2+IN23)=0.35154; TP1/TP2=1.52615; TP2/TP3=0.58966. It may control the sensitivity of manufacture of the system and lower the total height of the system.

The optical image capturing system of the present invention satisfies TP2/ΣTP=0.2369, where ΣTP is a sum of central thicknesses of the first lens 110 to the third lens 130 on the optical axis. It may fine tune and correct the aberration of the incident rays, and reduce the height of the system.

The optical image capturing system 10 of the first embodiment further satisfies InRS31=−0.1097 mm; InRS32=−0.3195 mm; |InRS31|+|InRS32|=0.42922 mm; |InRS31|/TP3=0.1923; and |InRS32|/TP3=0.5603, where InRS31 is a displacement from a point on the object-side surface 132 of the third lens 130 passed through by the optical axis to a point on the optical axis where a projection of the maximum effective semi diameter of the object-side surface 132 of the third lens 130 ends; InRS32 is a displacement from a point on the image-side surface 134 of the third lens 130 passed through by the optical axis to a point on the optical axis where a projection of the maximum effective semi diameter of the image-side surface 134 of the third lens 130 ends; and TP3 is a central thickness of the third lens 130 on the optical axis. It is helpful for manufacturing and shaping of the lenses and is helpful to reduce the size.

The optical image capturing system 10 of the first embodiment further satisfies HVT31=0.4455 mm; HVT32=0.6479 mm; HVT31/HVT32=0.6876, where HVT31 is a distance perpendicular to the optical axis between the critical point C31 on the object-side surface 132 of the third lens and the optical axis; and HVT32 is a distance perpendicular to the optical axis between the critical point C32 on the image-side surface 134 of the third lens and the optical axis.

The optical image capturing system 10 of the first embodiment satisfies HVT32/HOI=0.3616. It is helpful for correction of the aberration of the peripheral view field of the optical image capturing system.

The optical image capturing system 10 of the first embodiment satisfies HVT32/HOS=0.2226. It is helpful for correction of the aberration of the peripheral view field of the optical image capturing system.

The second lens 120 and the third lens 130 have negative refractive power. The optical image capturing system 10 of the first embodiment further satisfies |NA1−NA2|=33.5951; NA3/NA2=2.4969, where NA1 is an Abbe number of the first lens 110; NA2 is an Abbe number of the second lens 120; and NA3 is an Abbe number of the third lens 130. It may correct the aberration of the optical image capturing system.

The optical image capturing system 10 of the first embodiment further satisfies |TDT|=1.2939%; |ODT|=1.4381%, where TDT is TV distortion; and ODT is optical distortion.

For the third lens 130 of the optical image capturing system 10 in the first embodiment, a transverse aberration at 0.7 field of view in the positive direction of the tangential fan after the longest operation wavelength passing through the edge of the aperture 100 is denoted by PLTA, and is 0.0028 mm (pixel size is 1.12 μm); a transverse aberration at 0.7 field of view in the positive direction of the tangential fan after the shortest operation wavelength passing through the edge of the aperture 100 is denoted by PSTA, and is 0.0163 mm (pixel size is 1.12 μm); a transverse aberration at 0.7 field of view in the negative direction of the tangential fan after the longest operation wavelength passing through the edge of the aperture 100 is denoted by NLTA, and is 0.0118 mm (pixel size is 1.12 μm); a transverse aberration at 0.7 field of view in the negative direction of the tangential fan after the shortest operation wavelength passing through the edge of the aperture 100 is denoted by NSTA, and is −0.0019 mm (pixel size is 1.12 μm); a transverse aberration at 0.7 field of view of the sagittal fan after the longest operation wavelength passing through the edge of the aperture 100 is denoted by SLTA, and is −0.0103 mm (pixel size is 1.12 μm); a transverse aberration at 0.7 field of view of the sagittal fan after the shortest operation wavelength passing through the edge of the aperture 100 is denoted by SSTA, and is 0.0055 mm (pixel size is 1.12 μm).

The parameters of the lenses of the first embodiment are listed in Table 1 and Table 2.

TABLE 1 f = 2.42952 mm; f/HEP = 2.02; HAF = 35.87 deg; tan(HAF) = 0.7231

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1$^{st}$ lens | 0.848804821 | 0.513 | plastic | 1.535 | 56.070 | 2.273 |
| 2 | | 2.205401548 | 0.143 | | | | |
| 3 | Aperture | plane | 0.263 | | | | |
| 4 | 2$^{nd}$ lens | −1.208297825 | 0.336 | plastic | 1.643 | 22.470 | −5.225 |
| 5 | | −2.08494476 | 0.214 | | | | |
| 6 | 3$^{rd}$ lens | 1.177958479 | 0.570 | plastic | 1.544 | 56.090 | 7.012 |
| 7 | | 1.410696843 | 0.114 | | | | |
| 8 | Infrared rays filter | plane | 0.210 | BK7_SCHOTT | | | |
| 9 | | plane | 0.550 | | | | |
| 10 | Image plane | plane | 0.000 | | | | |

Reference wavelength: 555 nm; the position of blocking light: the clear aperture of the first surface is 0.640 mm

TABLE 2

Coefficients of the aspheric surfaces

| Surface | 1 | 2 | 4 | 5 | 6 | 7 |
|---|---|---|---|---|---|---|
| k | 1.22106E−01 | 1.45448E+01 | 8.53809E−01 | 4.48992E−01 | −1.44104E+01 | −3.61090E+00 |
| A4 | −6.43320E−04 | −9.87186E−02 | −7.81909E−01 | −1.69310E+00 | −7.90920E−01 | −5.19895E−01 |
| A6 | −2.58026E−02 | 2.63247E+00 | −8.49939E−01 | 5.85139E+00 | 4.98290E−01 | 4.24519E−01 |
| A8 | 1.00186E+00 | −5.88099E+01 | 3.03407E+01 | −1.67037E+01 | 2.93540E−01 | −3.12444E−01 |
| A10 | −4.23805E+00 | 5.75648E+02 | −3.11976E+02 | 2.77661E+01 | −3.15288E−01 | 1.42703E−01 |
| A12 | 9.91922E+00 | −3.00096E+03 | 1.45641E+03 | −5.46620E+01 | −9.66930E−02 | −2.76209E−02 |
| A14 | −1.17917E+01 | 7.91934E+03 | −2.89774E+03 | −2.59816E+01 | 1.67006E−01 | −3.11872E−03 |
| A16 | 8.87410E+00 | −8.51578E+03 | 1.35594E+03 | 1.43091E+01 | −4.43712E−02 | 1.34499E−03 |
| A18 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

The figures related to the profile curve lengths obtained based on Table 1 and Table 2 are listed in the following table:

| \multicolumn{7}{c}{First embodiment (Reference wavelength: 555 nm)} |
| ARE | ½(HEP) | ARE value | ARE-½(HEP) | 2(ARE/HEP) % | TP | ARE/TP (%) |
| --- | --- | --- | --- | --- | --- | --- |
| 11 | 0.604 | 0.678 | 0.074 | 112.28% | 0.513 | 132.12% |
| 12 | 0.506 | 0.511 | 0.005 | 101.08% | 0.513 | 99.66% |
| 21 | 0.509 | 0.552 | 0.043 | 108.36% | 0.336 | 164.03% |
| 22 | 0.604 | 0.640 | 0.036 | 106.04% | 0.336 | 190.42% |
| 31 | 0.604 | 0.606 | 0.002 | 100.28% | 0.570 | 106.18% |
| 32 | 0.604 | 0.607 | 0.003 | 100.50% | 0.570 | 106.41% |
| ARS | EHD | ARS value | ARS-EHD | (ARS/EHD)% | TP | ARS/TP(%) |
| 11 | 0.640 | 0.736 | 0.096 | 114.97% | 0.513 | 143.37% |
| 12 | 0.506 | 0.511 | 0.005 | 101.08% | 0.513 | 99.66% |
| 21 | 0.509 | 0.552 | 0.043 | 108.36% | 0.336 | 164.03% |
| 22 | 0.710 | 0.758 | 0.048 | 106.79% | 0.336 | 225.48% |
| 31 | 1.091 | 1.111 | 0.020 | 101.83% | 0.570 | 194.85% |
| 32 | 1.340 | 1.478 | 0.138 | 110.32% | 0.570 | 259.18% |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
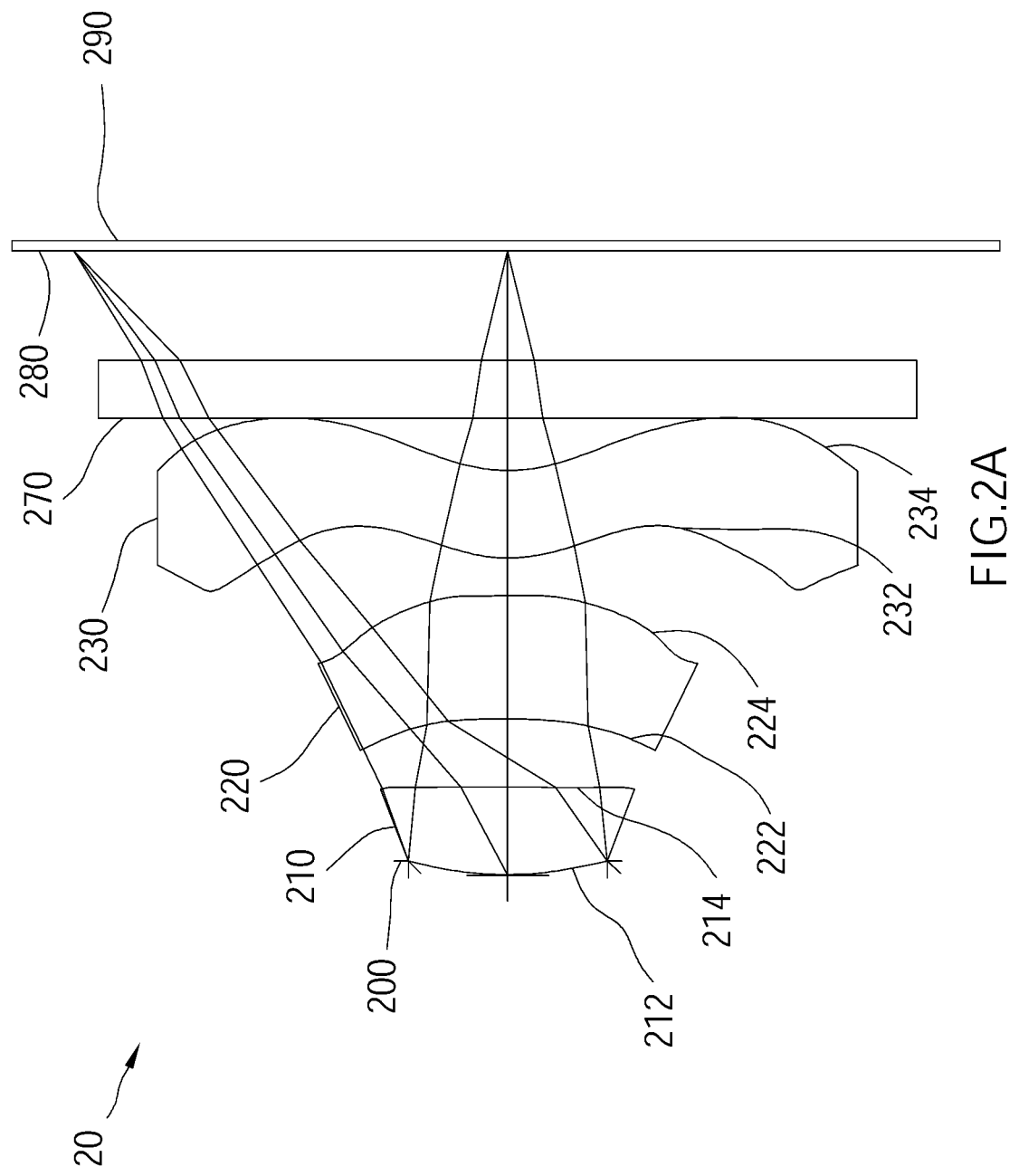
FIG. 2A is a schematic diagram of a second embodiment of the present invention.
Figure 2B:
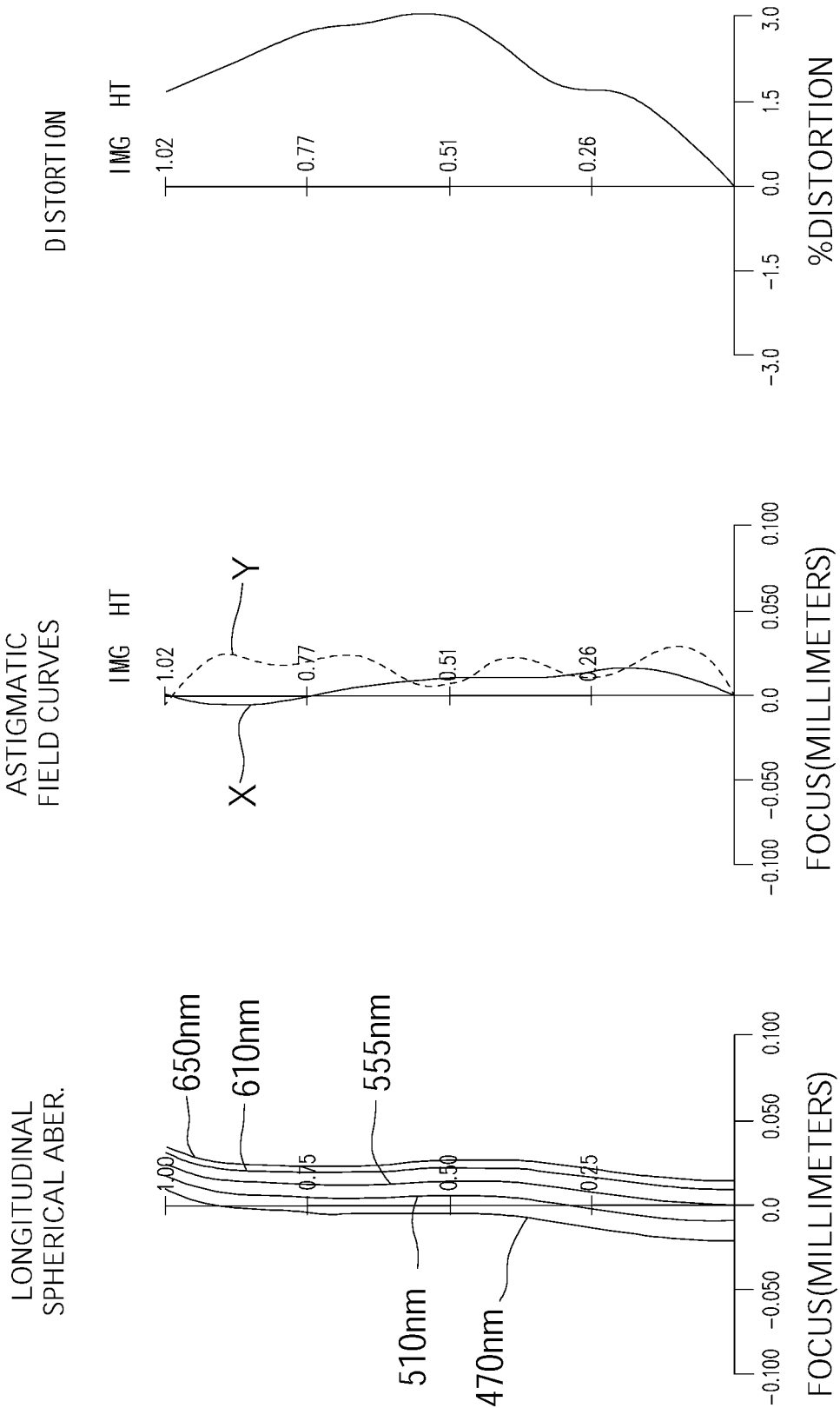
FIG. 2B shows curve diagrams of longitudinal spherical aberration, astigmatic field, and optical distortion of the optical image capturing system in the order from left to right of the second embodiment of the present application.
Figure 2C:
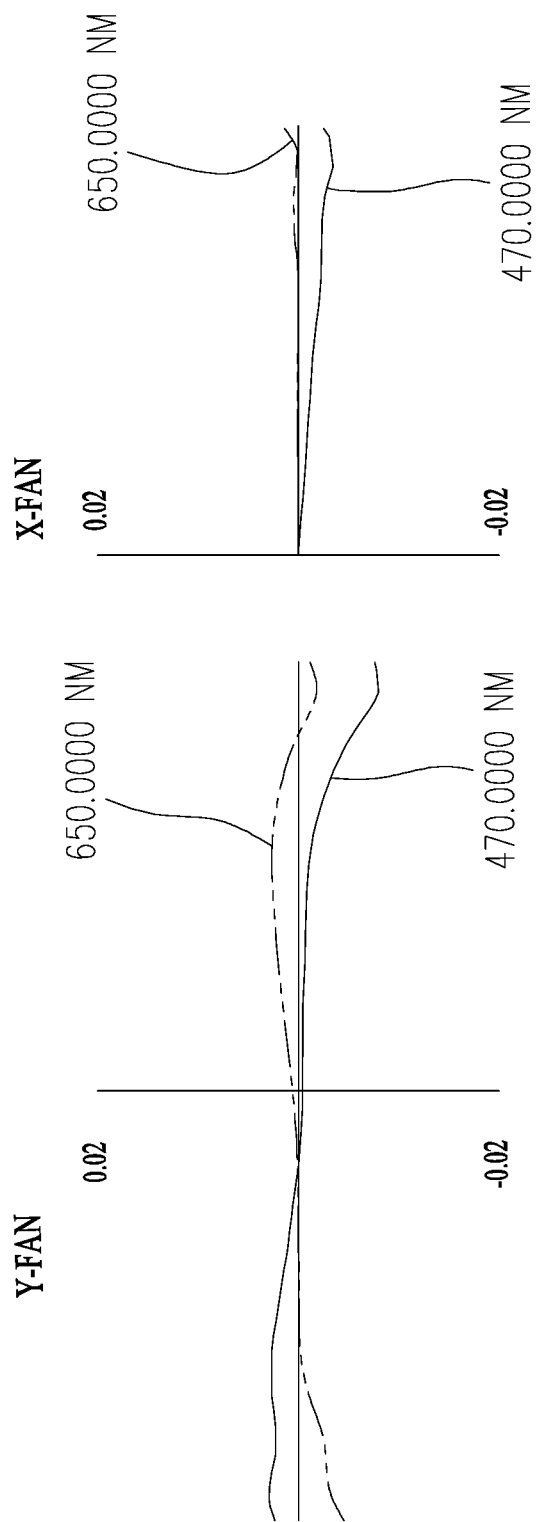
FIG. 2C shows a tangential fan and a sagittal fan of the optical image capturing system of the second embodiment of the present application, and a transverse aberration diagram at 0.7 field of view when a longest operation wavelength and a shortest operation wavelength pass through an edge of an aperture.

As shown in FIG. 2A and FIG. 2B, an optical image capturing system 20 of the second embodiment of the present invention includes, along an optical axis from an object side to an image side, a first lens 210/an aperture 200, a second lens 220, a third lens 230, an infrared rays filter 270, an image plane 280, and an image sensor 290. FIG. 2C is a transverse aberration diagram at 0.7 field of view of the second embodiment of the present application.

The first lens 210 has positive refractive power and is made of plastic. An object-side surface 212 thereof, which faces the object side, is a convex aspheric surface, and an image-side surface 214 thereof, which faces the image side, is a concave aspheric surface. The image-side surface 214 has an inflection point.

The second lens 220 has negative refractive power and is made of plastic. An object-side surface 222 thereof, which faces the object side, is a concave aspheric surface, and an image-side surface 224 thereof, which faces the image side, is a concave aspheric surface. The object-side surface 222 has an inflection point, and the image-side surface 224 has two inflection points.

The third lens 230 has positive refractive power and is made of plastic. An object-side surface 232, which faces the object side, is a convex aspheric surface, and an image-side surface 234, which faces the image side, is a concave aspheric surface. The object-side surface 232 and the image-side surface 234 both have an inflection point.

The infrared rays filter 270 is made of glass and between the third lens 230 and the image plane 280. The infrared rays filter 270 gives no contribution to the focal length of the system.

The parameters of the lenses of the second embodiment are listed in Table 3 and Table 4.

| \multicolumn{7}{c}{f = 1.0576 mm; f/HEP = 2.23; HAF = 43.5006 deg} |
| Surface | | Radius of curvature (mm) | Thickness (mm) | Material | Refractive index | Abbe number | Focal length (mm) |
| --- | --- | --- | --- | --- | --- | --- | --- |
| 0 | Object | 1E+18 | 600 | | | | |
| 1 | Aperture/ 1$^{st}$ lens | 0.779569455 | 0.221 | plastic | 1.535 | 56.274 | 1.63083 |
| 2 | | 6.460655013 | 0.168 | | | | |
| 3 | 2$^{nd}$ lens | −1.306228036 | 0.287 | plastic | 1.535 | 56.274 | −2.28393 |
| 4 | | 21.19482978 | 0.111 | | | | |
| 5 | 3$^{rd}$ lens | 0.319967501 | 0.243 | plastic | 1.642 | 22.456 | 1.16598 |
| 6 | | 0.389557202 | 0.130 | | | | |
| 7 | Infrared rays filter | 1E+18 | 0.145 | BK7_SCHOTT | 1.517 | 64.198 | |
| 8 | | 1E+18 | 0.275 | | | | |
| 9 | Image plane | 1E+18 | 0.000 | | | | |

Reference wavelength: 555 nm; the position of blocking light: none.

TABLE 4

| Coefficients of the aspheric surfaces | | | | | | |
|---|---|---|---|---|---|---|
| Surface | 1 | 2 | 3 | 4 | 5 | 6 |
| k | 2.918070E−01 | −2.999999E+03 | 1.770967E+00 | 1.999932E+03 | −4.985105E+00 | −1.967704E+00 |
| A4 | −4.160586E−01 | −5.392042E−01 | −4.016587E+00 | −2.259288E+01 | −8.971496E−01 | −3.025409E+00 |
| A6 | −1.840493E+01 | 5.259615E+01 | 1.895487E+02 | 4.728239E+02 | −8.411090E+00 | 1.556627E+00 |
| A8 | 1.132121E+03 | −4.669603E+03 | −9.225795E+03 | −8.245185E+03 | −1.619327E+02 | 2.482046E+01 |
| A10 | −2.871599E+04 | 1.682734E+05 | 2.524188E+05 | 1.002710E+05 | 2.023554E+03 | −8.698177E+01 |
| A12 | 7.595495E+02 | −3.338456E+06 | −4.355235E+06 | −8.344093E+05 | −9.525760E+03 | 9.511815E+01 |
| A14 | 7.590501E+06 | 3.687760E+07 | 4.741031E+07 | 4.707166E+06 | 2.304638E+04 | 8.428642E+01 |
| A16 | 3.547147E+07 | −2.036147E+08 | −3.120346E+08 | −1.740156E+07 | −2.847454E+04 | −3.313826E+02 |
| A18 | −3.043264E+09 | 3.367051E+08 | 1.134802E+09 | 3.852498E+07 | 1.423777E+04 | 3.285770E+02 |
| A20 | 2.340159E+10 | 7.660644E+08 | −1.757817E+09 | −3.878246E+07 | 0.000000E+00 | −1.148981E+02 |

An equation of the aspheric surfaces of the second embodiment is the same as that of the first embodiment, and the definitions are the same as well.

The exact parameters of the second embodiment based on Table 3 and Table 4 are listed in the following table:

| Second embodiment (Reference wavelength: 555 nm) | | | | | |
|---|---|---|---|---|---|
| $|f/f1|$ | $|f/f2|$ | $|f/f3|$ | $|f1/f2|$ | $|f2/f3|$ | TP1/TP2 |
| 0.66244 | 0.46803 | 0.89672 | 1.41538 | 0.52193 | 0.71458 |
| ΣPPR | ΣNPR | ΣPPR/\|ΣNPR\| | IN12/f | IN23/f | TP2/TP3 |
| 1.55916 | 0.46803 | 3.33134 | 0.16399 | 0.09035 | 1.39739 |
| TP2/(IN12 + TP2 + IN23) | | (TP1 + IN12)/TP2 | | (TP3 + IN23)/TP2 | |
| 0.53671 | | 1.02225 | | 1.02225 | |
| HOS | InTL | HOS/HOI | InS/HOS | ODT % | TDT % |
| 1.58000 | 1.02636 | 1.53696 | 0.97780 | 2.98368 | 1.31824 |
| HVT21 | HVT22 | HVT31 | HVT32 | HVT32/ HOI | HVT32/ HOS |
| 0 | 0.011783 | 0.355057 | 0.518263 | 0.50415 | 0.32801 |
| TP1 | TP2 | TP3 | (R1 − R2)/(R1 + R2) | (R3 − R4)/(R3 + R4) | (R5 − R6)/(R5 + R6) |
| 0.2227 | 0.3116 | 0.2230 | −0.8242 | −1.0313 | −0.0810 |
| PLTA | PSTA | NLTA | NSTA | SLTA | SSTA |
| −0.008 mm | −0.001 mm | 0.002 mm | −0.005 mm | −0.003 mm | 0.001 mm |

The results of the equations of the second embodiment based on Table 3 and Table 4 are listed in the following table:

| Values related to the inflection points of the second embodiment (Reference wavelength: 555 nm) | | | | | | |
|---|---|---|---|---|---|---|
| HIF121 | 0.1050 | HIF121/HOI | 0.1021 | SGI121 | 0.0006 | \|SGI121\|/(\|SGI121\| + TP1) | 0.0025 |
| HIF211 | 0.3035 | HIF211/HOI | 0.2952 | SGI211 | −0.060811 | \|SGI211\|/(\|SGI211\| + TP2) | 0.2145 |
| HIF221 | 0.0068 | HIF221/HOI | 0.0066 | SGI221 | 0.000000 | \|SGI221\|/(\|SGI221\| + TP2) | 0.0000 |
| HIF222 | 0.3767 | HIF222/HOI | 0.3664 | SGI222 | −0.126391 | \|SGI222\|/(\|SGI222\| + TP2) | 0.3621 |
| HIF311 | 0.1855 | HIF311/HOI | 0.1804 | SGI311 | 0.0425346 | \|SGI311\|/(\|SGI311\| + TP3) | 0.1604 |
| HIF321 | 0.2328 | HIF321/HOI | 0.2265 | SGI321 | 0.0611559 | \|SGI321\|/(\|SGI321\| + TP3) | 0.2155 |

The figures related to the profile curve lengths obtained based on Table 3 and Table 4 are listed in the following table:

| Second embodiment (Reference wavelength: 555 nm) | | | | | | |
|---|---|---|---|---|---|---|
| ARE | ½(HEP) | ARE value | ARE−½(HEP) | 2(ARE/HEP) % | TP | ARE/TP (%) |
| 11 | 0.237 | 0.240 | 0.00311 | 101.31% | 0.223 | 107.93% |
| 12 | 0.238 | 0.237 | −0.00049 | 99.80% | 0.223 | 106.43% |

-continued

| Second embodiment (Reference wavelength: 555 nm) | | | | | |
|---|---|---|---|---|---|
| 21 | 0.238 | 0.240 | 0.00264 | 101.11% | 0.312 | 77.06% |
| 22 | 0.238 | 0.241 | 0.00361 | 101.52% | 0.312 | 77.37% |
| 31 | 0.238 | 0.246 | 0.00814 | 103.43% | 0.223 | 110.15% |
| 32 | 0.238 | 0.247 | 0.00942 | 103.97% | 0.223 | 110.72% |

| ARS | EHD | ARS value | ARS-EHD | (ARS/EHD)% | TP | ARS/TP (%) |
|---|---|---|---|---|---|---|
| 11 | 0.237 | 0.240 | 0.00311 | 101.31% | 0.223 | 107.93% |
| 12 | 0.301 | 0.301 | −0.00023 | 99.92% | 0.223 | 135.26% |
| 21 | 0.349 | 0.363 | 0.01356 | 103.88% | 0.312 | 116.47% |
| 22 | 0.451 | 0.499 | 0.04718 | 110.45% | 0.312 | 159.96% |
| 31 | 0.631 | 0.674 | 0.04301 | 106.82% | 0.223 | 302.23% |
| 32 | 0.833 | 0.890 | 0.05726 | 106.88% | 0.223 | 399.11% |

Third Embodiment

Figure 3A:
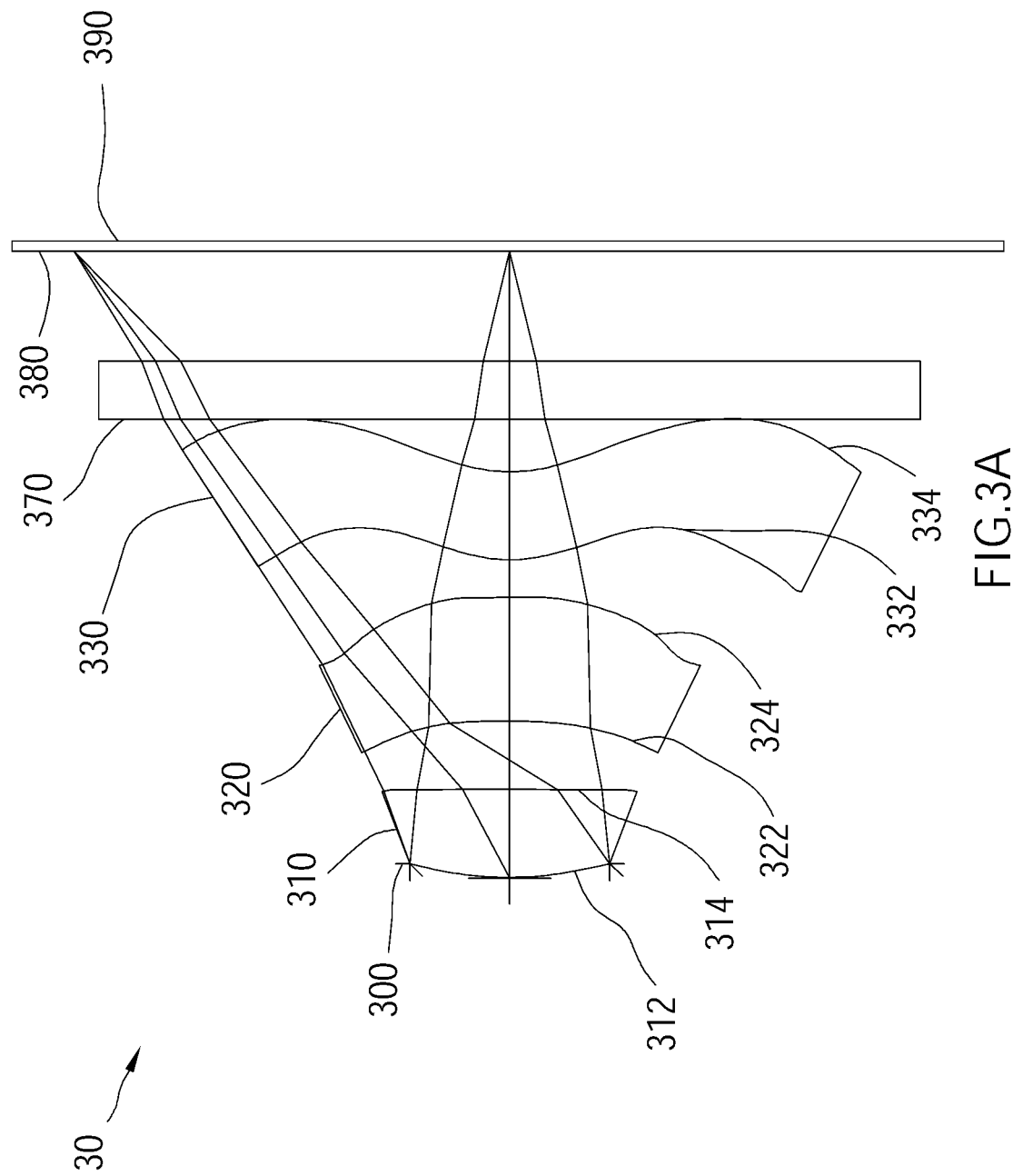
FIG. 3A is a schematic diagram of a third embodiment of the present invention.
Figure 3B:
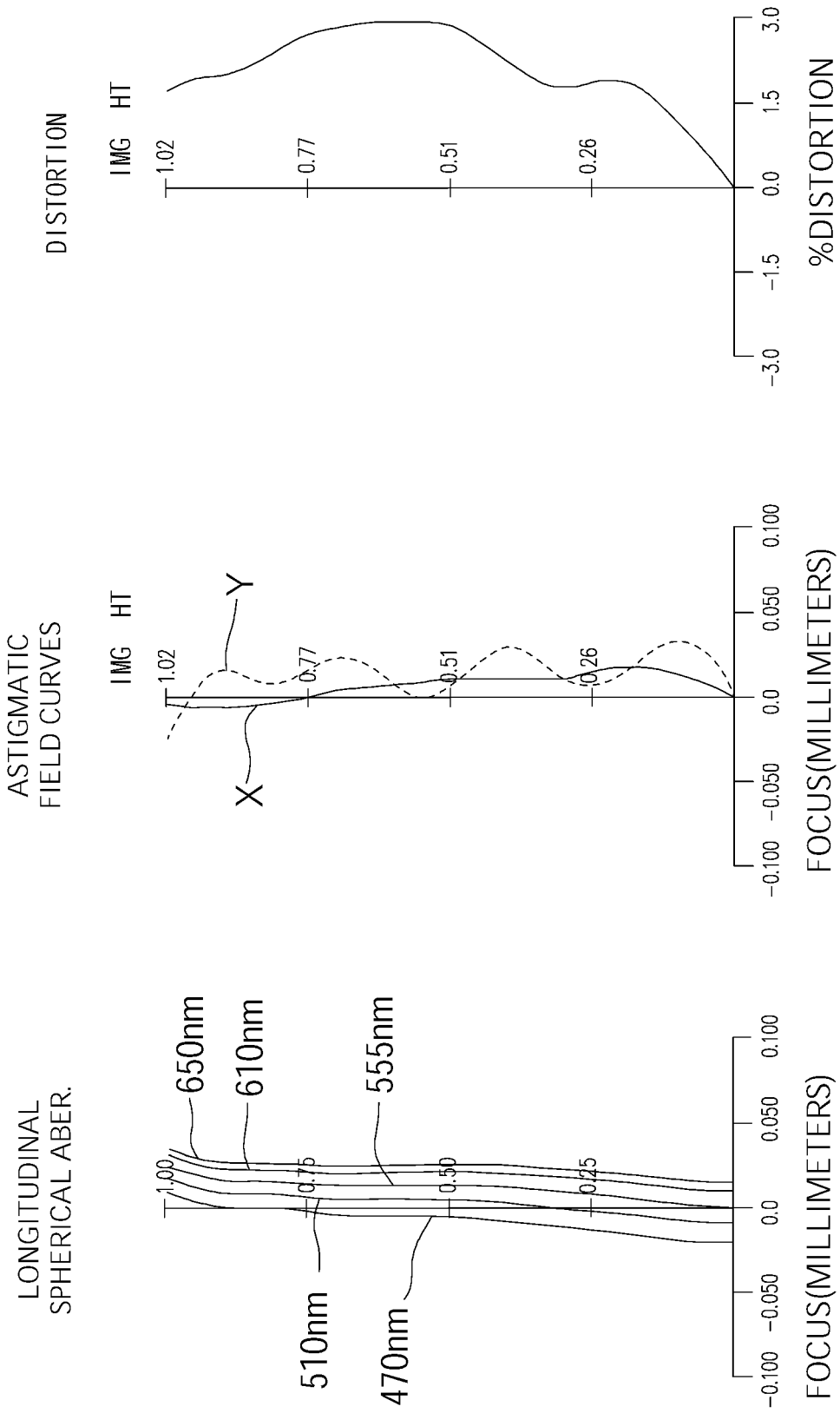
FIG. 3B shows curve diagrams of longitudinal spherical aberration, astigmatic field, and optical distortion of the optical image capturing system in the order from left to right of the third embodiment of the present application.
Figure 3C:
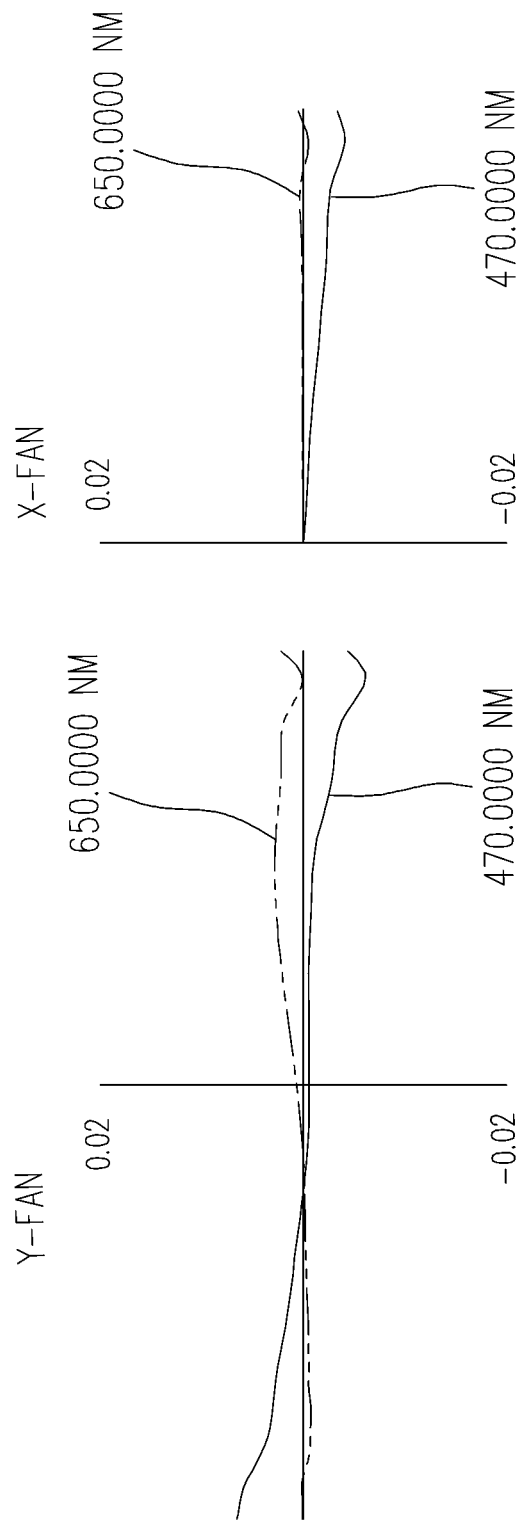
FIG. 3C shows a tangential fan and a sagittal fan of the optical image capturing system of the third embodiment of the present application, and a transverse aberration diagram at 0.7 field of view when a longest operation wavelength and a shortest operation wavelength pass through an edge of an aperture.

As shown in FIG. 3A and FIG. 3B, an optical image capturing system 30 of the third embodiment of the present invention includes, along an optical axis from an object side to an image side, a first lens 310/an aperture 300, a second lens 320, a third lens 330, an infrared rays filter 370, an image plane 380, and an image sensor 390. FIG. 3C is a transverse aberration diagram at 0.7 field of view of the third embodiment of the present application.

The first lens 310 has positive refractive power and is made of plastic. An object-side surface 312 thereof, which faces the object side, is a convex aspheric surface, and an image-side surface 314 thereof, which faces the image side, is a concave aspheric surface. The image-side surface 314 has an inflection point.

The second lens 320 has negative refractive power and is made of plastic. An object-side surface 322 thereof, which faces the object side, is a concave aspheric surface, and an image-side surface 324 thereof, which faces the image side, is a concave aspheric surface. The object-side surface 322 has an inflection point, and the image-side surface 324 has two inflection points.

The third lens 330 has positive refractive power and is made of plastic. An object-side surface 332 thereof, which faces the object side, is a convex aspheric surface, and an image-side surface 334 thereof, which faces the image side, is a concave aspheric surface. The object-side surface 332 has two inflection points, and the image-side surface 334 has an inflection point.

The infrared rays filter 370 is made of glass and between the third lens 330 and the image plane 380. The infrared rays filter 390 gives no contribution to the focal length of the system.

The parameters of the lenses of the third embodiment are listed in Table 5 and Table 6.

TABLE 5

| f = 1.0577 mm; f/HEP = 2.23; HAF = 43.50 deg | | | | | | |
|---|---|---|---|---|---|---|
| Surface | | Radius of curvature (mm) | Thickness (mm) | Material | Refractive index | Abbe number | Focal length (mm) |
| 0 | Object | 1E+18 | 600 | | | | |
| 1 | Aperture/ 1$^{st}$ lens | 0.779569455 | 0.221 | plastic | 1.535 | 56.274 | 1.63083 |
| 2 | | 6.460655013 | 0.168 | | | | |
| 3 | 2$^{nd}$ lens | −1.306228036 | 0.287 | plastic | 1.535 | 56.274 | −2.28393 |
| 4 | | 21.19482978 | 0.111 | | | | |
| 5 | 3$^{rd}$ lens | 0.319967501 | 0.243 | plastic | 1.642 | 22.456 | 1.16598 |
| 6 | | 0.389557202 | 0.130 | | | | |
| 7 | Infrared rays filter | 1E+18 | 0.145 | BK7_SCHOTT | 1.517 | 64.198 | |
| 8 | | 1E+18 | 0.275 | | | | |
| 9 | Image plane | 1E+18 | 0.000 | | | | |

Reference wavelength: 555 nm; the position of blocking light: none.

TABLE 6

| Coefficients of the aspheric surfaces | | | | | | |
|---|---|---|---|---|---|---|
| Surface | 1 | 2 | 3 | 4 | 5 | 6 |
| k | 5.717625E−01 | −3.000000E+03 | 1.766978E+00 | 1.999934E+03 | −5.530533E+00 | −1.948468E+00 |
| A4 | −1.509806E+00 | −4.539370E−01 | −4.127643E+00 | −2.133442E+01 | −3.126988E−01 | −3.211140E+00 |
| A6 | 2.058119E+02 | 9.209261E+01 | 9.378121E+01 | 4.295869E+02 | −1.284660E+01 | 9.777001E+00 |
| A8 | −2.128788E+04 | −9.004593E+03 | −2.932718E+03 | −7.056496E+03 | −8.138875E+01 | −4.728936E+01 |
| A10 | 1.255318E+06 | 4.099585E+05 | 5.503580E+04 | 7.561472E+04 | 1.369299E+03 | 2.491390E+02 |
| A12 | −4.501370E+07 | −1.098444E+07 | −7.731349E+05 | −4.912567E+05 | −7.129247E+03 | −8.732997E+02 |
| A14 | 9.911286E+08 | 1.793730E+08 | 8.209026E+06 | 1.697282E+06 | 1.909213E+04 | 1.848545E+03 |
| A16 | −1.303864E+10 | −1.751959E+09 | −5.747948E+07 | −1.600776E+06 | −2.664135E+04 | −2.297098E+03 |

TABLE 6-continued

| Coefficients of the aspheric surfaces | | | | | | |
|---|---|---|---|---|---|---|
| Surface | 1 | 2 | 3 | 4 | 5 | 6 |
| A18 | 9.372651E+10 | 9.400664E+09 | 2.325770E+08 | −6.548629E+06 | 1.542011E+04 | 1.543021E+03 |
| A20 | −2.823476E+11 | −2.128997E+10 | −4.120081E+08 | 1.479761E+07 | 0.000000E+00 | −4.314608E+02 |

An equation of the aspheric surfaces of the third embodiment is the same as that of the first embodiment, and the definitions are the same as well.

The exact parameters of the third embodiment based on Table 5 and Table 6 are listed in the following table:

| Third embodiment (Reference wavelength: 555 nm) | | | | | |
|---|---|---|---|---|---|
| $|f/f1|$ | $|f/f2|$ | $|f/f3|$ | $|f1/f2|$ | $|f2/f3|$ | TP1/TP2 |
| 0.64857 | 0.46311 | 0.90713 | 1.40047 | 0.51051 | 0.77030 |
| ΣPPR | ΣNPR | ΣPPR/$|$ΣNPR$|$ | IN12/f | IN23/f | TP2/TP3 |
| 1.55570 | 0.46311 | 3.35928 | 0.15873 | 0.10520 | 1.17819 |
| TP2/(IN12 + TP2 + IN23) | | (TP1 + IN12)/TP2 | | (TP3 + IN23)/TP3 | |
| 0.50667 | | 1.23686 | | 1.23686 | |
| HOS | InTL | HOS/HOI | InS/HOS | ODT % | TDT % |
| 1.58000 | 1.03004 | 1.53696 | 0.97758 | 2.87255 | 1.25542 |
| HVT21 | HVT22 | HVT31 | HVT32 | HVT32/HOI | HVT32/HOS |
| 0.00000 | 0.02373 | 0.36951 | 0.52751 | 0.51314 | 0.33387 |
| TP1 | TP2 | TP3 | (R1 − R2)/(R1 + R2) | (R3 − R4)/(R3 + R4) | (R5 − R6)/(R5 + R6) |
| 0.2208 | 0.2867 | 0.2433 | −0.7847 | −1.1314 | −0.0981 |
| PLTA | PSTA | NLTA | NSTA | SLTA | SSTA |
| −0.004 mm | 0.002 mm | 0.007 mm | 0.00012 mm | −0.003 mm | 0.001 mm |

The results of the equations of the third embodiment based on Table 5 and Table 6 are listed in the following table:

| Values related to the inflection points of the third embodiment (Reference wavelength: 555 nm) | | | | | | | |
|---|---|---|---|---|---|---|---|
| HIF111 | 0.1125 | HIF111/HOI | 0.1094 | SGI111 | 0.000801 | $|$SGI111$|$/($|$SGI111$|$ + TP1) | 0.0036 |
| HIF112 | 0.2906 | HIF112/HOI | 0.2827 | SGI112 | −0.0023 | $|$SGI112$|$/($|$SGI112$|$ + TP1) | 0.0103 |
| HIF211 | 0.3009 | HIF211/HOI | 0.2927 | SGI211 | −0.0587 | $|$SGI211$|$/($|$SGI211$|$ + TP2) | 0.2100 |
| HIF221 | 0.0136 | HIF221/HOI | 0.0133 | SGI221 | 0.000004 | $|$SGI221$|$/($|$SGI221$|$ + TP2) | 0.0000 |
| HIF222 | 0.3699 | HIF222/HOI | 0.3599 | SGI222 | −0.1144 | $|$SGI222$|$/($|$SGI222$|$ + TP2) | 0.3413 |
| HIF311 | 0.1927 | HIF311/HOI | 0.1874 | SGI311 | 0.04302 | $|$SGI311$|$/($|$SGI311$|$ + TP3) | 0.1630 |
| HIF321 | 0.2435 | HIF321/HOI | 0.2369 | SGI321 | 0.060427 | $|$SGI321$|$/($|$SGI321$|$ + TP3) | 0.2148 |

The figures related to the profile curve lengths obtained based on Table 5 and Table 6 are listed in the following table:

| Third embodiment (Reference wavelength: 555 nm) | | | | | | |
|---|---|---|---|---|---|---|
| ARE | ½ (HEP) | ARE value | ARE-½(HEP) | 2(ARE/HEP) % | TP | ARE/TP (%) |
| 11 | 0.238 | 0.240 | 0.00290 | 101.22% | 0.221 | 108.86% |
| 12 | 0.238 | 0.237 | −0.00050 | 99.79% | 0.221 | 107.32% |
| 21 | 0.238 | 0.240 | 0.00258 | 101.09% | 0.287 | 83.75% |
| 22 | 0.238 | 0.241 | 0.00313 | 101.32% | 0.287 | 83.94% |
| 31 | 0.238 | 0.245 | 0.00755 | 103.18% | 0.243 | 100.71% |
| 32 | 0.238 | 0.245 | 0.00797 | 103.36% | 0.243 | 100.88% |

-continued

Third embodiment (Reference wavelength: 555 nm)

| ARS | EHD | ARS value | ARS-EHD | (ARS/EHD)% | TP | ARS/TP (%) |
|---|---|---|---|---|---|---|
| 11 | 0.238 | 0.240 | 0.00289 | 101.22% | 0.221 | 108.86% |
| 12 | 0.301 | 0.301 | 0.00010 | 100.03% | 0.221 | 136.35% |
| 21 | 0.349 | 0.362 | 0.01278 | 103.66% | 0.287 | 126.25% |
| 22 | 0.441 | 0.481 | 0.04036 | 109.16% | 0.287 | 167.81% |
| 31 | 0.633 | 0.675 | 0.04226 | 106.68% | 0.243 | 277.37% |
| 32 | 0.834 | 0.891 | 0.05758 | 106.91% | 0.243 | 366.23% |

Fourth Embodiment

Figure 4A:
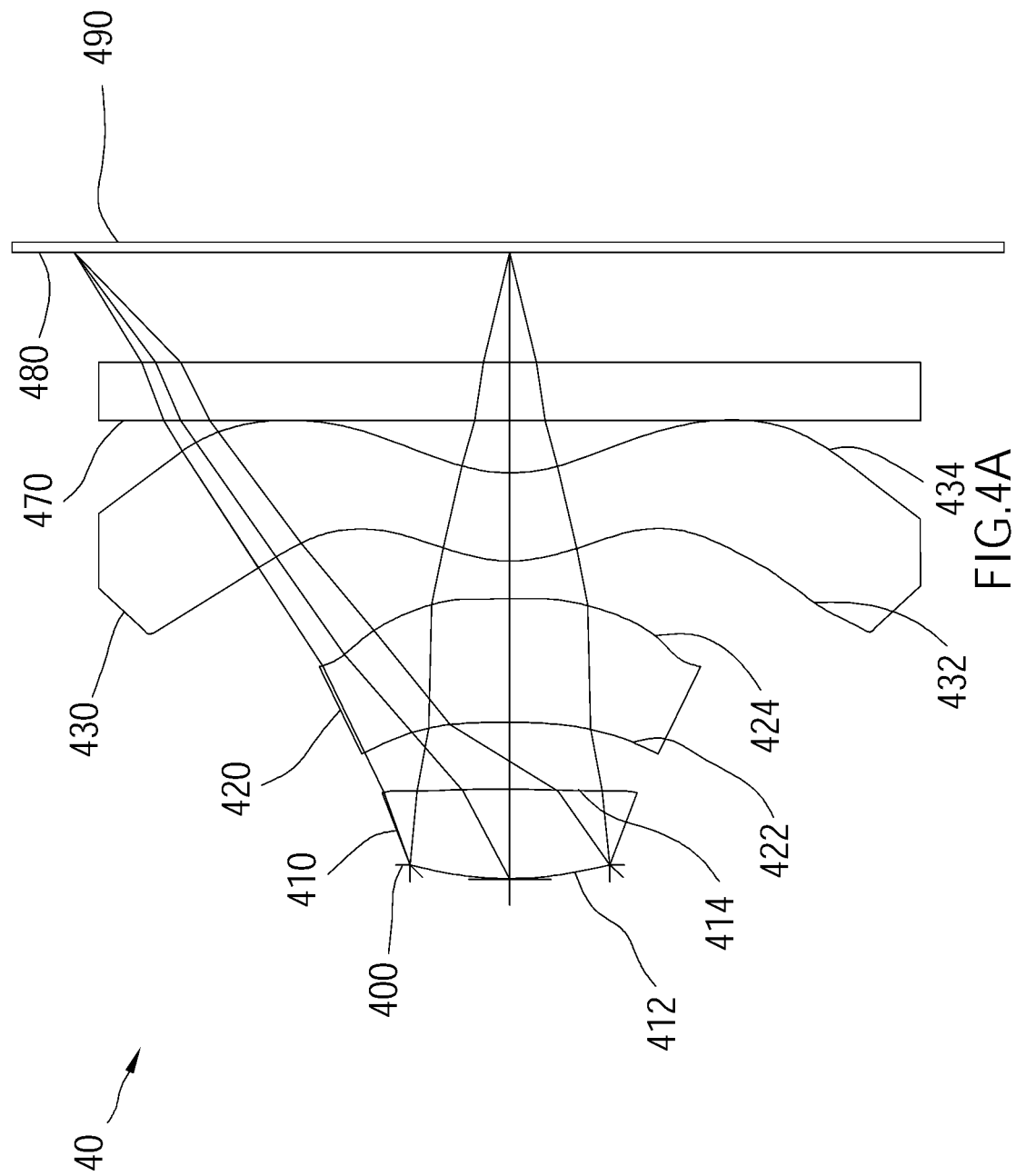
FIG. 4A is a schematic diagram of a fourth embodiment of the present invention.
Figure 4B:
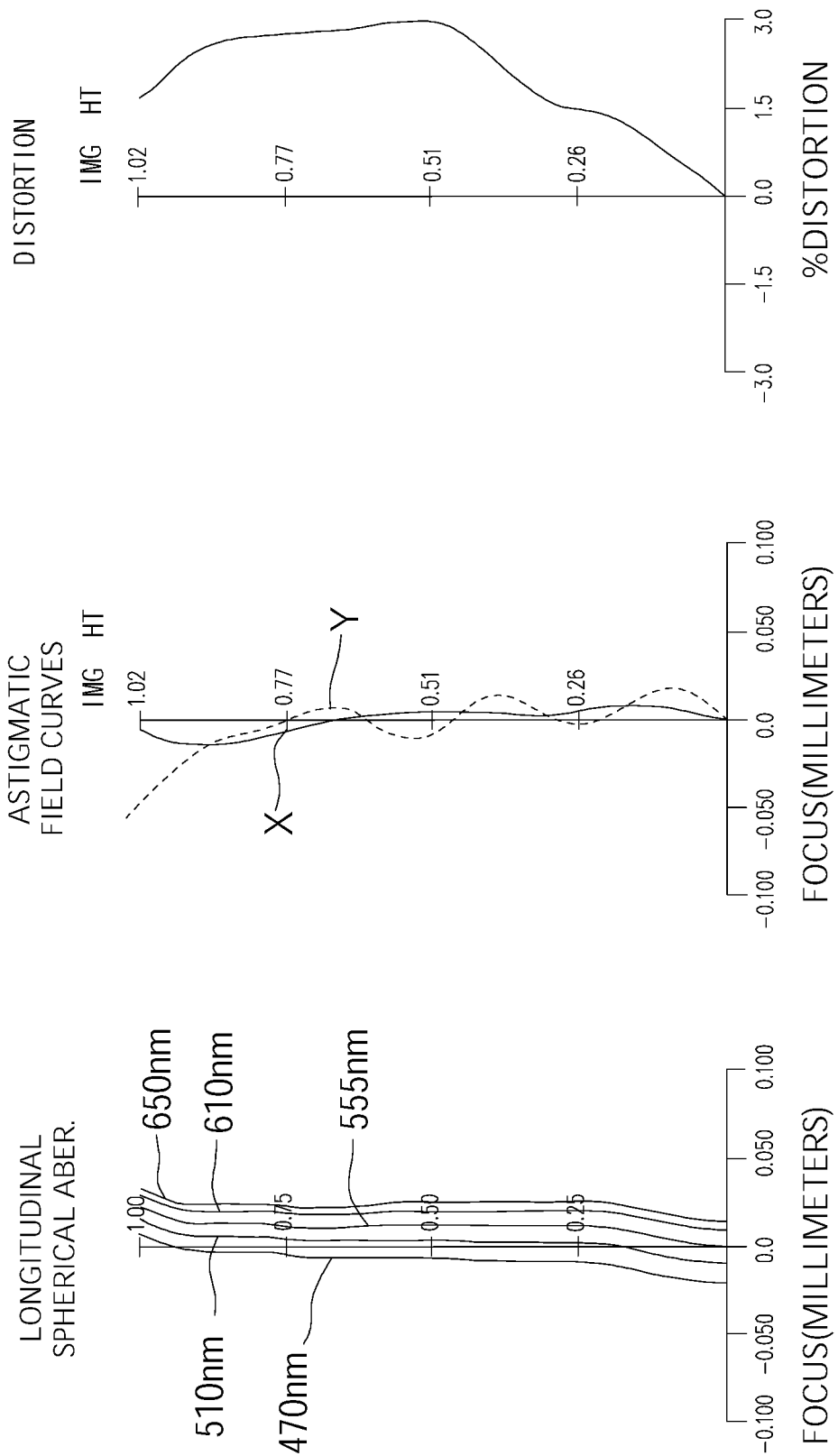
FIG. 4B shows curve diagrams of longitudinal spherical aberration, astigmatic field, and optical distortion of the optical image capturing system in the order from left to right of the fourth embodiment of the present application.
Figure 4C:
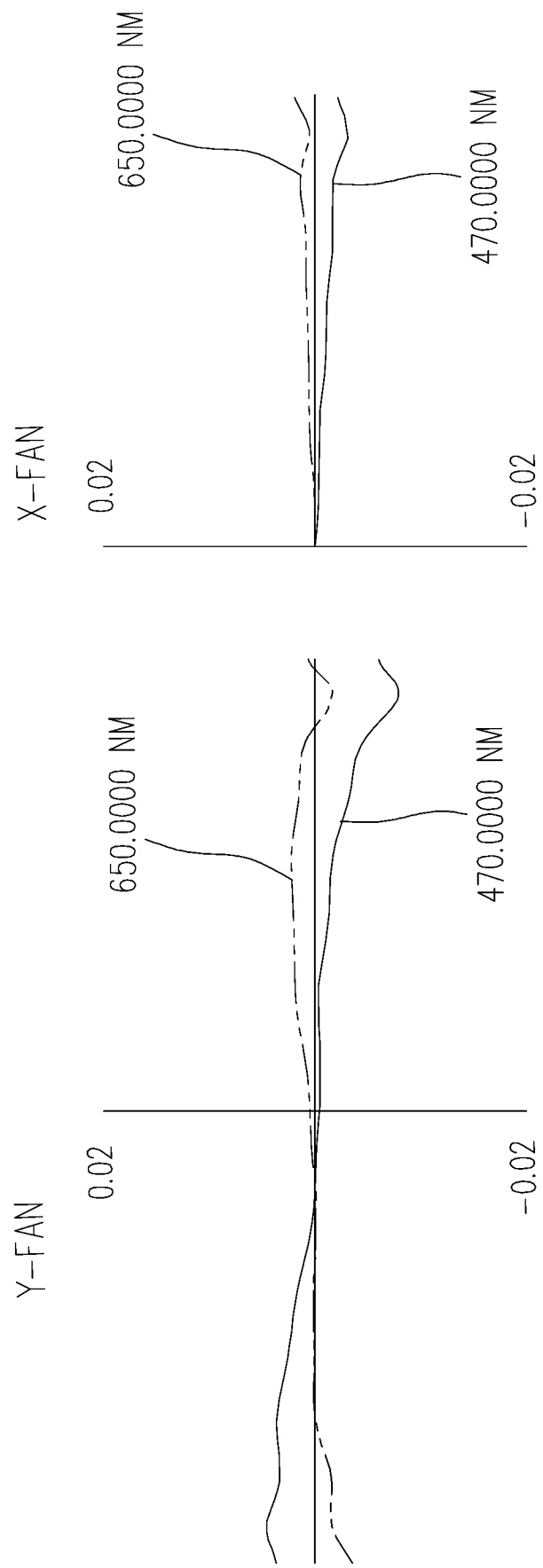
FIG. 4C shows a tangential fan and a sagittal fan of the optical image capturing system of the fourth embodiment of the present application, and a transverse aberration diagram at 0.7 field of view when a longest operation wavelength and a shortest operation wavelength pass through an edge of an aperture.

As shown in FIG. 4A and FIG. 4B, an optical image capturing system 40 of the fourth embodiment of the present invention includes, along an optical axis from an object side to an image side, a first lens 410/an aperture 400, a second lens 420, a third lens 430, an infrared rays filter 470, an image plane 480, and an image sensor 490. FIG. 4C is a transverse aberration diagram at 0.7 field of view of the fourth embodiment of the present application.

The first lens 410 has positive refractive power and is made of plastic. An object-side surface 412 thereof, which faces the object side, is a convex aspheric surface, and an image-side surface 414 thereof, which faces the image side, is a concave aspheric surface. The image-side surface 414 has an inflection point.

The second lens 420 has negative refractive power and is made of plastic. An object-side surface 422 thereof, which faces the object side, is a concave aspheric surface, and an image-side surface 424 thereof, which faces the image side, is a concave aspheric surface. The object-side surface 422 has an inflection point, and the image-side surface 424 has two inflection points.

The third lens 430 has positive refractive power and is made of plastic. An object-side surface 432 thereof, which faces the object side, is a convex aspheric surface, and an image-side surface 434 thereof, which faces the image side, is a concave aspheric surface. The object-side surface 432 has two inflection points, and the image-side surface 434 has an inflection point.

The infrared rays filter 470 is made of glass and between the third lens 430 and the image plane 480. The infrared rays filter 470 gives no contribution to the focal length of the system.

The parameters of the lenses of the fourth embodiment are listed in Table 7 and Table 8.

TABLE 7 f = 1.0953 mm; f/HEP = 2.3; HAF = 42.4998 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | Aperture/ 1$^{st}$ lens | 0.718182674 | 0.227 | plastic | 1.535 | 56.274 | 1.58545 |
| 2 | | 4.110210434 | 0.182 | | | | |
| 3 | 2$^{nd}$ lens | −1.305274811 | 0.281 | plastic | 1.535 | 56.274 | −2.28425 |
| 4 | | 21.45173323 | 0.111 | | | | |
| 5 | 3$^{rd}$ lens | 0.310060865 | 0.229 | plastic | 1.642 | 22.456 | 1.25812 |
| 6 | | 0.355657848 | 0.129 | | | | |
| 7 | Infrared rays filter | 1E+18 | 0.145 | BK7_SCHOTT | 1.517 | 64.198 | |
| 8 | | 1E+18 | 0.275 | | | | |
| 9 | Image plane | 1E+18 | 0.000 | | | | |

Reference wavelength: 555 nm; the position of blocking light: none.

TABLE 8

Coefficients of the aspheric surfaces

| Surface | 1 | 2 | 3 | 4 | 5 | 6 |
|---|---|---|---|---|---|---|
| k | 2.702252E−01 | −2.999999E+03 | 1.770967E+00 | 1.999932E+03 | −4.578355E+00 | −1.744236E+00 |
| A4 | −3.587532E+00 | 3.444059E+00 | −3.743426E+00 | −2.068017E+01 | −1.137341E+01 | −3.435431E+00 |
| A6 | 5.807481E+02 | −2.019969E+02 | 5.572537E+01 | 3.931522E+02 | −8.417735E+00 | −8.173717E−01 |
| A8 | −5.429580E+04 | 7.633276E+03 | −1.314119E+03 | −6.375004E+03 | −1.785762E+02 | 6.140583E+01 |
| A10 | 2.930171E+06 | −2.287826E+05 | −3.866137E+03 | 6.965306E+04 | 2.187413E+03 | −2.918409E+02 |
| A12 | −9.668570E+07 | 4.949607E+06 | 6.339473E+05 | −4.938511E+05 | −9.984590E+03 | 7.457833E+02 |
| A14 | 1.975046E+09 | −7.310324E+07 | −1.258722E+07 | 2.233818E+06 | 2.316126E+04 | −1.156374E+03 |
| A16 | −2.433536E+10 | 6.858689E+08 | 1.227990E+08 | −6.318723E+06 | −2.718920E+04 | 1.063430E+03 |
| A18 | 1.655225E+11 | −3.644226E+09 | −6.056450E+08 | 1.101192E+07 | 1.281033E+04 | −5.204120E+02 |
| A20 | −4.769146E+11 | 8.301263E+09 | 1.201664E+09 | −1.002504E+07 | 0.000000E+00 | 1.004081E+02 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth embodiment (Reference wavelength: 555 nm) | | | | | |
|---|---|---|---|---|---|
| \|f/f1\| | \|f/f2\| | \|f/f3\| | \|f1/f2\| | \|f2/f3\| | TP1/TP2 |
| 0.69082 | 0.47948 | 0.87055 | 1.44076 | 0.55078 | 0.80905 |
| ΣPPR | ΣNPR | ΣPPR/\|ΣNPR\| | IN12/f | IN23/f | TP2/TP3 |
| 1.56137 | 0.47948 | 3.25636 | 0.16632 | 0.10178 | 1.22954 |
| TP2/(IN12 + TP2 + IN23) | | (TP1 + IN12)/TP2 | | (TP3 + IN23)/TP2 | |
| 0.48916 | | 1.20978 | | 1.20978 | |
| HOS | InTL | HOS/HOI | InS/HOS | ODT % | TDT % |
| 1.58000 | 1.03102 | 1.53696 | 0.97384 | 2.94761 | 1.25713 |
| HVT21 | HVT22 | HVT31 | HVT32 | HVT32/HOI | HVT32/HOS |
| 0.00000 | 0.02395 | 0.34770 | 0.50331 | 0.48960 | 0.31855 |
| TP1 | TP2 | TP3 | (R1 − R2)/(R1 + R2) | (R3 − R4)/(R3 + R4) | (R5 − R6)/(R5 + R6) |
| 0.2275 | 0.2812 | 0.2287 | −0.7025 | −1.1296 | −0.0685 |
| PLTA | PSTA | NLTA | NSTA | SLTA | SSTA |
| −0.006 mm | 0.001 mm | 0.004 mm | −0.004 mm | −0.002 mm | 0.002 mm |

The results of the equations of the fourth embodiment based on Table 7 and Table 8 are listed in the following table:

| Values related to the inflection points of the fourth embodiment (Reference wavelength: 555 nm) | | | | | | |
|---|---|---|---|---|---|---|
| HIF111 | 0.1366 | HIF111/HOI | 0.1329 | SGI111 | 0.00193 | \|SGI111\|/(\|SGI111\| + TP1) 0.0084 |
| HIF211 | 0.3211 | HIF211/HOI | 0.3123 | SGI211 | −0.07716 | \|SGI211\|/(\|SGI211\| + TP2) 0.2533 |
| HIF221 | 0.0138 | HIF221/HOI | 0.0134 | SGI221 | 0.000004 | \|SGI221\|/(\|SGI221\| + TP2) 0.0000 |
| HIF222 | 0.3722 | HIF222/HOI | 0.3620 | SGI222 | −0.1214 | \|SGI222\|/(\|SGI222\| + TP2) 0.3479 |
| HIF311 | 0.1847 | HIF311/HOI | 0.1796 | SGI311 | 0.042064 | \|SGI311\|/(\|SGI311\| + TP3) 0.1560 |
| HIF312 | 0.5786 | HIF312/HOI | 0.5628 | SGI312 | −0.0104 | \|SGI312\|/(\|SGI312\| + TP3) 0.0435 |
| HIF321 | 0.2280 | HIF321/HOI | 0.2218 | SGI321 | 0.059163 | \|SGI321\|/(\|SGI321\| + TP3) 0.2064 |

The figures related to the profile curve lengths obtained based on Table 7 and Table 8 are listed in the following table:

| Fourth embodiment (Reference wavelength: 555 nm) | | | | | | |
|---|---|---|---|---|---|---|
| ARE | ½ (HEP) | ARE value | ARE−½(HEP) | 2(ARE/HEP) % | TP | ARE/TP (%) |
| 11 | 0.246 | 0.249 | 0.00348 | 101.42% | 0.227 | 109.66% |
| 12 | 0.246 | 0.245 | −0.00096 | 99.61% | 0.227 | 107.71% |
| 21 | 0.246 | 0.249 | 0.00302 | 101.23% | 0.281 | 88.56% |
| 22 | 0.246 | 0.250 | 0.00351 | 101.43% | 0.281 | 88.73% |
| 31 | 0.246 | 0.254 | 0.00800 | 103.25% | 0.229 | 111.07% |
| 32 | 0.246 | 0.256 | 0.00954 | 103.88% | 0.229 | 111.74% |
| ARS | EHD | ARS value | ARS−EHD | (ARS/EHD)% | TP | ARS/TP (%) |
| 11 | 0.258 | 0.262 | 0.00455 | 101.77% | 0.227 | 115.22% |
| 12 | 0.311 | 0.311 | 0.00003 | 100.01% | 0.227 | 136.85% |
| 21 | 0.344 | 0.362 | 0.01783 | 105.18% | 0.281 | 128.66% |
| 22 | 0.436 | 0.481 | 0.04484 | 110.28% | 0.281 | 171.00% |
| 31 | 0.593 | 0.628 | 0.03412 | 105.75% | 0.229 | 274.40% |
| 32 | 0.861 | 0.934 | 0.07275 | 108.45% | 0.229 | 408.31% |

Fifth Embodiment

Figure 5B:
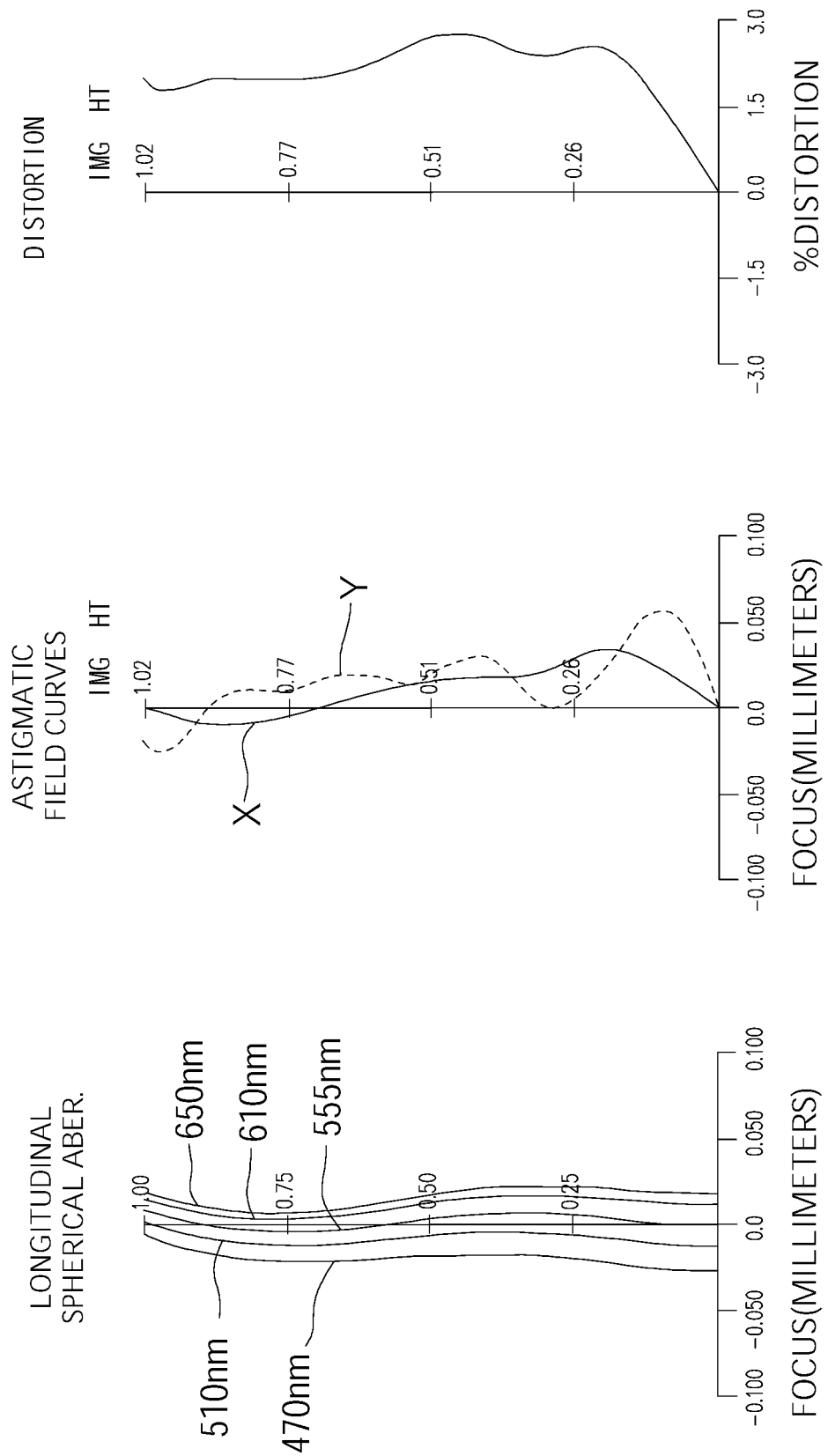
FIG. 5B shows curve diagrams of longitudinal spherical aberration, astigmatic field, and optical distortion of the optical image capturing system in the order from left to right of the fifth embodiment of the present application.
Figure 5C:
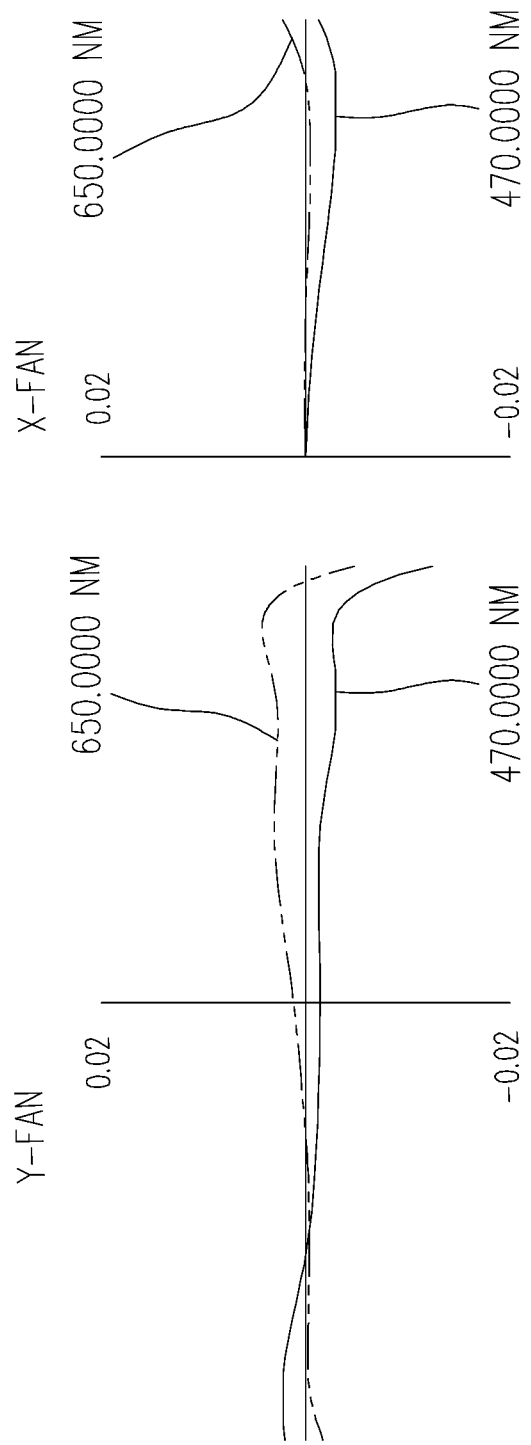
FIG. 5C shows a tangential fan and a sagittal fan of the optical image capturing system of the fifth embodiment of the present application, and a transverse aberration diagram at 0.7 field of view when a longest operation wavelength and a shortest operation wavelength pass through an edge of an aperture.

As shown in FIG. 5A and FIG. 5B, an optical image capturing system 50 of the fifth embodiment of the present invention includes, along an optical axis from an object side to an image side, a first lens 510/an aperture 500, a second lens 520, a third lens 530, an infrared rays filter 570, an image plane 580, and an image sensor 590. FIG. 5C is a transverse aberration diagram at 0.7 field of view of the fifth embodiment of the present application.

The first lens 510 has positive refractive power and is made of plastic. An object-side surface 512, which faces the object side, is a convex aspheric surface, and an image-side surface 514, which faces the image side, is a concave aspheric surface. The image-side surface 514 has an inflection point.

The second lens 520 has negative refractive power and is made of plastic. An object-side surface 522 thereof, which faces the object side, is a concave aspheric surface, and an image-side surface 524 thereof, which faces the image side, is a concave aspheric surface. The object-side surface 522 has an inflection point, and the image-side surface 524 has two inflection point.

The third lens 530 has positive refractive power and is made of plastic. An object-side surface 532, which faces the object side, is a convex aspheric surface, and an image-side surface 534, which faces the image side, is a concave aspheric surface. The object-side surface 532 has an inflection point, and the image-side surface 534 has an inflection point.

The infrared rays filter 570 is made of glass and between the third lens 530 and the image plane 580. The infrared rays filter 570 gives no contribution to the focal length of the system.

The parameters of the lenses of the fifth embodiment are listed in Table 9 and Table 10.

TABLE 9 f = 1.0077 mm; f/HEP = 2.200; HAF = 44.9812 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | Aperture/ 1$^{st}$ lens | 0.901601422 | 0.220 | plastic | 1.535 | 56.274 | 1.68333 |
| 2 | | 608.0161404 | 0.193 | | | | |
| 3 | 2$^{nd}$ lens | −0.816737522 | 0.246 | plastic | 1.535 | 56.274 | −1.26919 |
| 4 | | 4.51635853 | 0.077 | | | | |
| 5 | 3$^{rd}$ lens | 0.258379841 | 0.220 | plastic | 1.642 | 22.456 | 0.772968 |
| 6 | | 0.355657848 | 0.165 | | | | |
| 7 | Infrared rays filter | 1E+18 | 0.145 | BK7_SCHOTT | 1.517 | 64.198 | |
| 8 | | 1E+18 | 0.275 | | | | |
| 9 | Image plane | 1E+18 | 0.001 | | | | |

Reference wavelength: 555 nm; the position of blocking light: none.

TABLE 10

Coefficients of the aspheric surfaces

| Surface | 1 | 2 | 3 | 4 | 5 | 6 |
|---|---|---|---|---|---|---|
| k | −1.441365E+00 | −9.000000E+01 | −9.175909E−02 | 9.000000E+01 | −4.174137E+00 | −2.392267E+00 |
| A4 | 4.861627E−02 | −1.825279E+00 | −2.617207E−01 | −3.087289E+01 | −4.094549E+00 | −3.471642E+00 |
| A6 | −4.832064E+00 | 5.065922E+01 | −4.897160E+01 | 5.339334E+02 | 2.042859E+01 | 6.813258E+00 |
| A8 | 0.000000E+00 | −1.219259E+03 | 1.248014E+02 | −6.935820E+03 | −2.547068E+02 | 1.589243E+00 |
| A10 | 0.000000E+00 | 1.507684E+04 | 5.343538E+03 | 5.875481E+04 | 1.946982E+03 | −3.099968E+01 |
| A12 | 0.000000E+00 | −6.885452E+04 | −2.570360E+04 | −3.114639E+05 | −7.334305E+03 | 5.215833E+01 |
| A14 | 0.000000E+00 | 0.000000E+00 | 0.000000E+00 | 9.677157E+05 | 1.347760E+04 | −3.751596E+01 |
| A16 | 0.000000E+00 | 0.000000E+00 | 0.000000E+00 | −1.328589E+06 | −9.848253E+03 | 9.411820E+00 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

An equation of the aspheric surfaces of the fifth embodiment is the same as that of the first embodiment, and the definitions are the same as well.

The exact parameters of the fifth embodiment based on Table 9 and Table 10 are listed in the following table:

Fifth embodiment (Reference wavelength: 555 nm)

| |f/f1| | |f/f2| | |f/f3| | |f1/f2| | |f2/f3| | TP1/TP2 |
|---|---|---|---|---|---|
| 0.59863 | 0.79397 | 1.30368 | 0.75398 | 0.60902 | 0.89524 |
| ΣPPR | ΣNPR | ΣPPR/ |ΣNPR| | IN12/f | IN23/f | TP2/TP3 |
| 1.90231 | 0.79397 | 2.39595 | 0.19123 | 0.07608 | 1.11702 |
| TP2/(IN12 + TP2 + IN23) | | (TP1 + IN12)/TP2 | | (TP3 + IN23)/TP2 | |
| 0.47707 | | 1.20721 | | 1.20721 | |
| HOS | InTL | HOS/HOI | InS/HOS | ODT % | TDT % |
| 1.54105 | 0.95511 | 1.49908 | 0.98158 | 2.69660 | 0.50343 |
| HVT21 | HVT22 | HVT31 | HVT32 | HVT32/HOI | HVT32/HOS |
| 0.00000 | 0.04348 | 0.36252 | 0.50476 | 0.49101 | 0.32754 |

-continued

| Fifth embodiment (Reference wavelength: 555 nm) | | | | | |
|---|---|---|---|---|---|
| TP1 | TP2 | TP3 | (R1 − R2)/(R1 + R2) | (R3 − R4)/(R3 + R4) | (R5 − R6)/(R5 + R6) |
| 0.2200 | 0.2457 | 0.2200 | −0.9970 | −1.4415 | −0.1584 |
| PLTA | PSTA | NLTA | NSTA | SLTA | SSTA |
| −0.012 mm | −0.005 mm | 0.002 mm | −0.002 mm | −0.001 mm | 0.002 mm |

The results of the equations of the fifth embodiment based on Table 9 and Table 10 are listed in the following table:

| Values related to the inflection points of the fifth embodiment (Reference wavelength: 555 nm) | | | | | | | |
|---|---|---|---|---|---|---|---|
| HIF111 | 0.0087 | HIF111/HOI | 0.0085 | SGI111 | 0.00000 | \|SGI111\|/(\|SGI111\| + TP1) | 0.000000 |
| HIF211 | 0.2719 | HIF211/HOI | 0.2645 | SGI211 | −0.05635 | \|SGI211\|/(\|SGI211\| + TP2) | 0.2039 |
| HIF221 | 0.0248 | HIF221/HOI | 0.0242 | SGI221 | 0.000057 | \|SGI221\|/(\|SGI221\| + TP2) | 0.0003 |
| HIF222 | 0.3413 | HIF222/HOI | 0.3320 | SGI222 | −0.1182 | \|SGI222\|/(\|SGI222\| + TP2) | 0.3495 |
| HIF311 | 0.1661 | HIF311/HOI | 0.1616 | SGI311 | 0.039557 | \|SGI311\|/(\|SGI311\| + TP3) | 0.1524 |
| HIF321 | 0.2165 | HIF321/HOI | 0.2106 | SGI321 | 0.052151 | \|SGI321\|/(\|SGI321\| + TP3) | 0.1916 |

The figures related to the profile curve lengths obtained based on Table 9 and Table 10 are listed in the following table:

| Fifth embodiment (Reference wavelength: 555 nm) | | | | | | |
|---|---|---|---|---|---|---|
| ARE | ½(HEP) | ARE value | ARE−½(HEP) | 2(ARE/HEP) % | TP | ARE/TP (%) |
| 11 | 0.229 | 0.231 | 0.00196 | 100.85% | 0.220 | 105.13% |
| 12 | 0.229 | 0.229 | −0.00030 | 99.87% | 0.220 | 104.10% |
| 21 | 0.229 | 0.233 | 0.00414 | 101.80% | 0.246 | 95.00% |
| 22 | 0.229 | 0.235 | 0.00524 | 102.29% | 0.246 | 95.45% |
| 31 | 0.229 | 0.238 | 0.00883 | 103.85% | 0.220 | 108.25% |
| 32 | 0.229 | 0.237 | 0.00802 | 103.50% | 0.220 | 107.88% |
| ARS | EHD | ARS value | ARS−EHD | (ARS/EHD)% | TP | ARS/TP (%) |
| 11 | 0.229 | 0.231 | 0.00195 | 100.85% | 0.220 | 105.13% |
| 12 | 0.299 | 0.298 | −0.00048 | 99.84% | 0.220 | 135.49% |
| 21 | 0.361 | 0.374 | 0.01287 | 103.56% | 0.246 | 152.31% |
| 22 | 0.427 | 0.475 | 0.04895 | 111.48% | 0.246 | 193.48% |
| 31 | 0.584 | 0.610 | 0.02598 | 104.45% | 0.220 | 277.26% |
| 32 | 0.751 | 0.787 | 0.03587 | 104.77% | 0.220 | 357.88% |

Sixth Embodiment

Figure 6A:
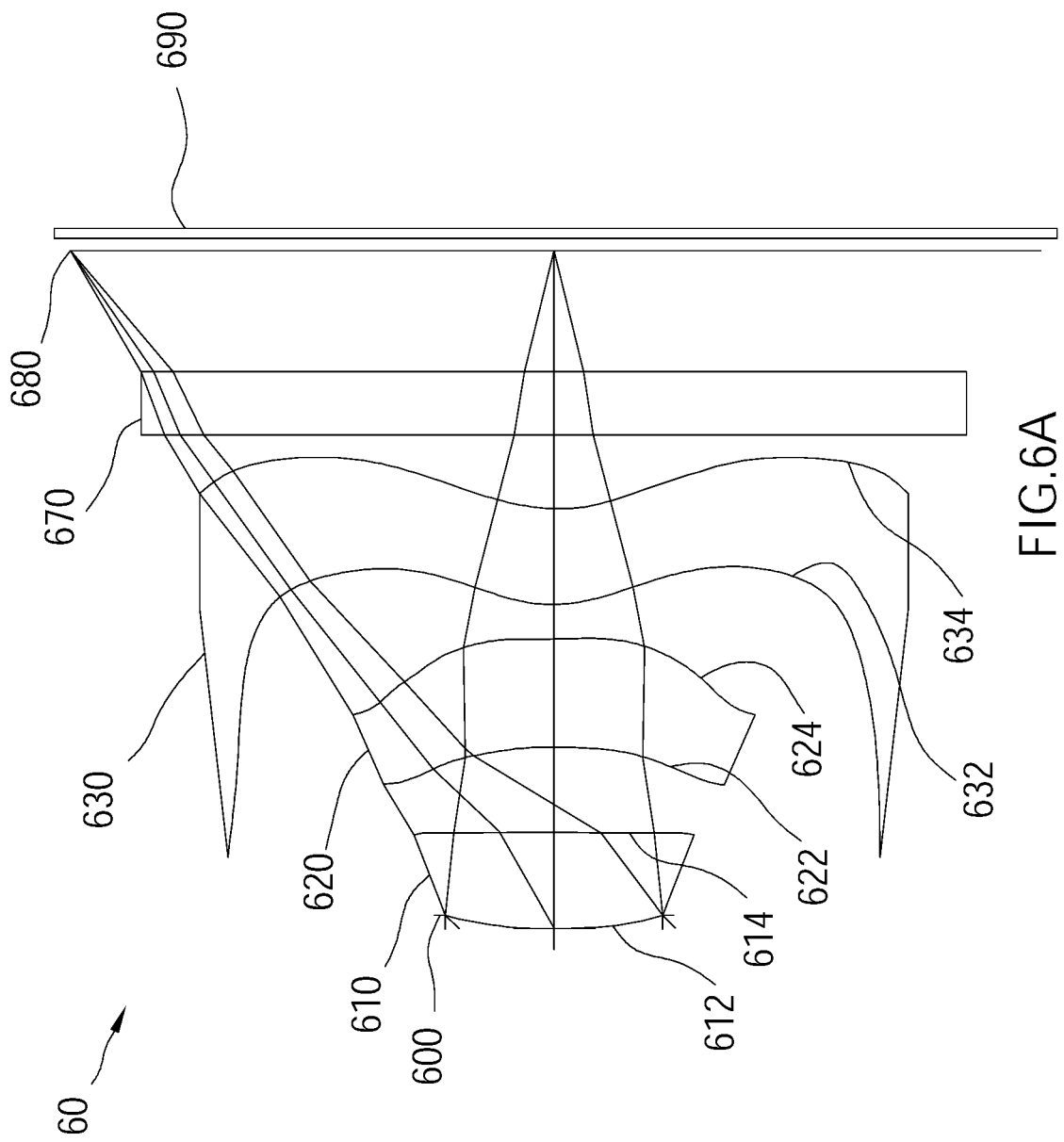
FIG. 6A is a schematic diagram of a sixth embodiment of the present invention.
Figure 6B:
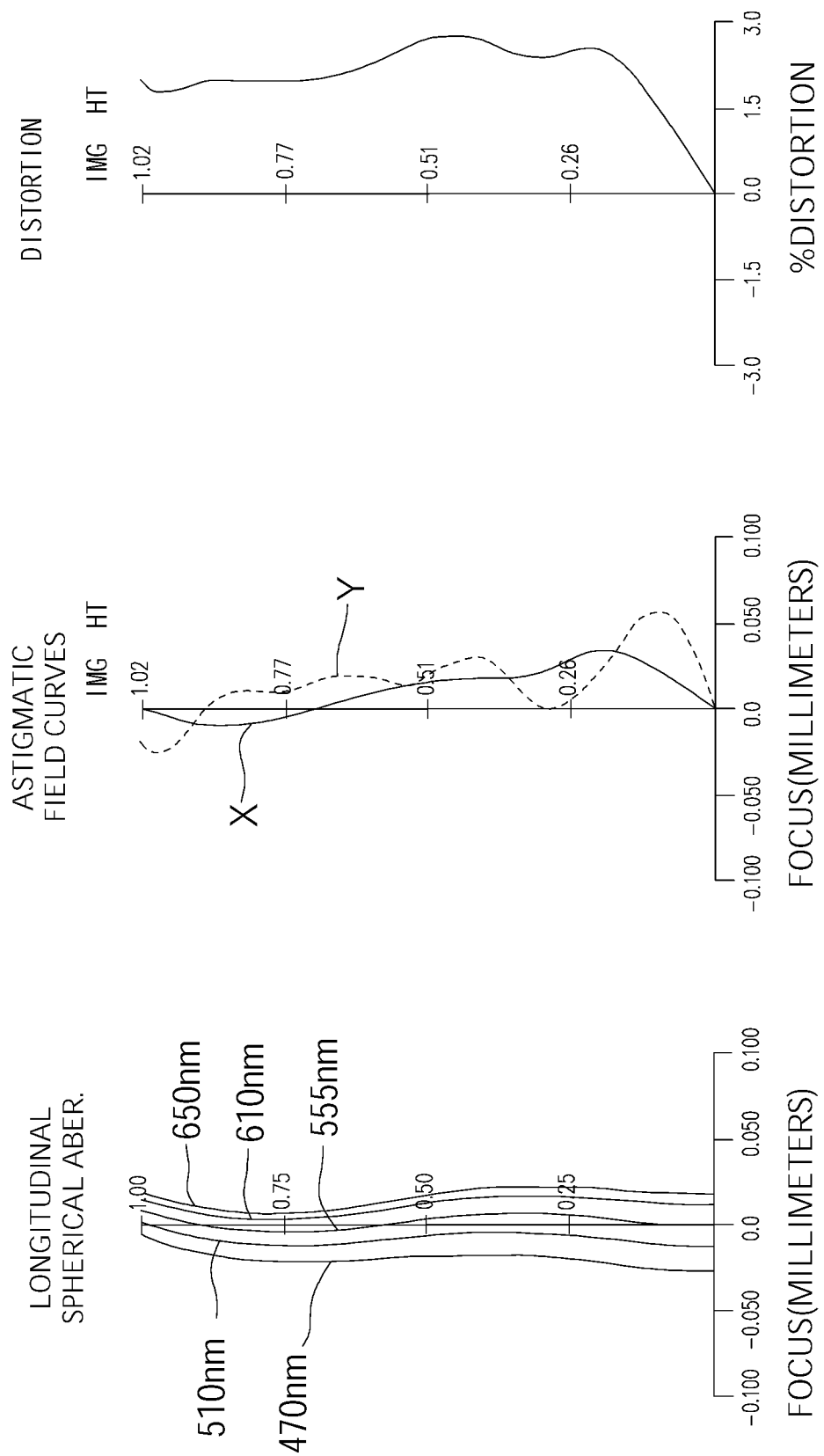
FIG. 6B shows curve diagrams of longitudinal spherical aberration, astigmatic field, and optical distortion of the optical image capturing system in the order from left to right of the sixth embodiment of the present application.
Figure 6C:
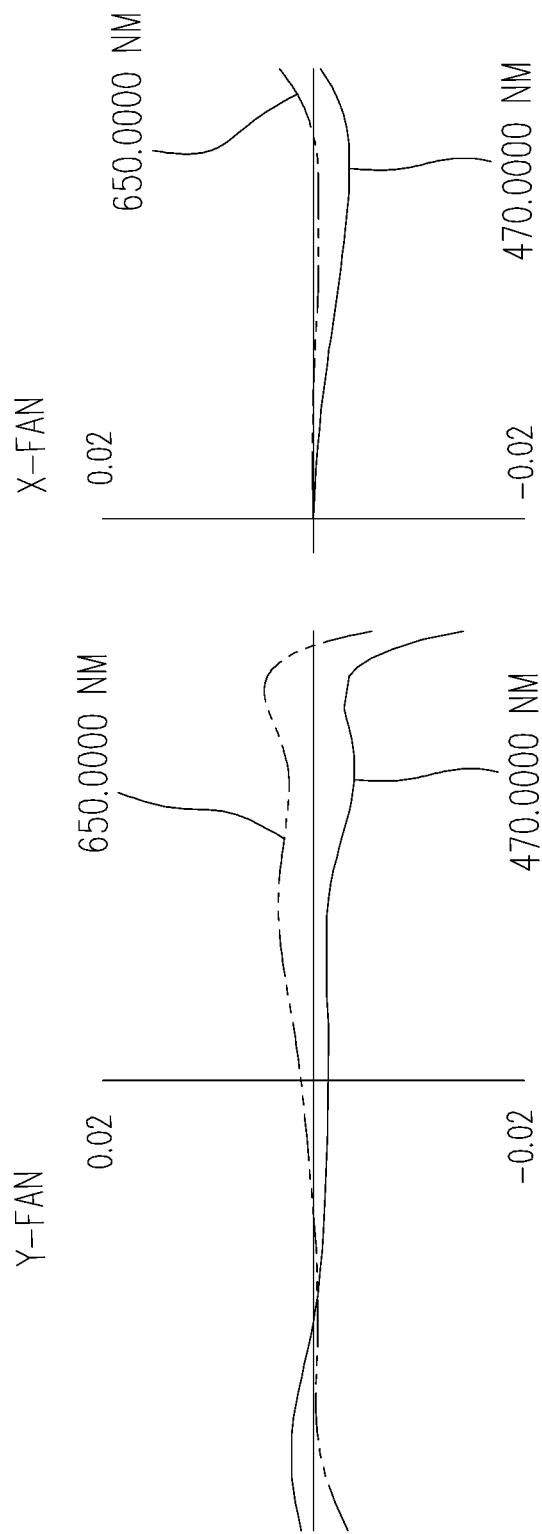
FIG. 6C shows a tangential fan and a sagittal fan of the optical image capturing system of the sixth embodiment of the present application, and a transverse aberration diagram at 0.7 field of view when a longest operation wavelength and a shortest operation wavelength pass through an edge of an aperture.

As shown in FIG. 6A and FIG. 6B, an optical image capturing system 60 of the sixth embodiment of the present invention includes, along an optical axis from an object side to an image side, a first lens 610/an aperture 600, a second lens 620, a third lens 630, an infrared rays filter 670, an image plane 680, and an image sensor 690. FIG. 6C is a transverse aberration diagram at 0.7 field of view of the sixth embodiment of the present application.

The first lens 610 has positive refractive power and is made of plastic. An object-side surface 612, which faces the object side, is a convex aspheric surface, and an image-side surface 614, which faces the image side, is a concave aspheric surface. The image-side surface 614 has an inflection point.

The second lens 620 has negative refractive power and is made of plastic. An object-side surface 622 thereof, which faces the object side, is a concave aspheric surface, and an image-side surface 624 thereof, which faces the image side, is a concave aspheric surface. The object-side surface 622 has an inflection point, and the image-side surface 624 has two inflection points.

The third lens 630 has positive refractive power and is made of plastic. An object-side surface 632, which faces the object side, is a convex aspheric surface, and an image-side surface 634, which faces the image side, is a concave aspheric surface. The object-side surface 632 and the image-side surface 634 both have an inflection point.

The infrared rays filter 670 is made of glass and between the third lens 630 and the image plane 680. The infrared rays filter 670 gives no contribution to the focal length of the system.

The parameters of the lenses of the sixth embodiment are listed in Table 11 and Table 12.

TABLE 11 f = 1.0075 mm; f/HEP = 2.000; HAF = 44.9818 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | Aperture/ 1$^{st}$ lens | 0.883933193 | 0.220 | plastic | 1.535 | 56.274 | 1.68251 |
| 2 | | 39.46822555 | 0.189 | | | | |
| 3 | 2$^{nd}$ lens | −0.839925856 | 0.253 | plastic | 1.535 | 56.274 | −1.30107 |
| 4 | | 4.557558979 | 0.076 | | | | |
| 5 | 3$^{rd}$ lens | 0.259925188 | 0.220 | plastic | 1.642 | 22.456 | 0.784187 |
| 6 | | 0.355657848 | 0.163 | | | | |
| 7 | Infrared rays filter | 1E+18 | 0.145 | BK7_SCHOTT | 1.517 | 64.198 | |
| 8 | | 1E+18 | 0.274 | | | | |
| 9 | Image plane | 1E+18 | 0.001 | | | | |

Reference wavelength: 555 nm; the position of blocking light: none.

TABLE 12

Coefficients of the aspheric surfaces

| Surface | 1 | 2 | 3 | 4 | 5 | 6 |
|---|---|---|---|---|---|---|
| k   | −1.441365E+00 | −9.000000E+01 | −9.175909E−02 |  9.000000E+01 | −4.174137E+00 | −2.392267E+00 |
| A4  |  4.861627E−02 | −1.825279E+00 | −2.617207E−01 | −3.087289E+01 | −4.094549E+00 | −3.471642E+00 |
| A6  | −4.832064E+00 |  5.065922E+01 | −4.897160E+01 |  5.339334E+02 |  2.042859E+01 |  6.813258E+00 |
| A8  |  0.000000E+00 | −1.219259E+03 |  1.248014E+02 | −6.935820E+03 | −2.547068E+02 |  1.589243E+00 |
| A10 |  0.000000E+00 |  1.507684E+04 |  5.343538E+03 |  5.875481E+04 |  1.946982E+03 | −3.099968E+01 |
| A12 |  0.000000E+00 | −6.885452E+04 | −2.570360E+04 | −3.114639E+05 | −7.334305E+03 |  5.215833E+01 |
| A14 |  0.000000E+00 |  0.000000E+00 |  0.000000E+00 |  9.677157E+05 |  1.347760E+04 | −3.751596E+01 |
| A16 |  0.000000E+00 |  0.000000E+00 |  0.000000E+00 | −1.328589E+06 | −9.848253E+03 |  9.411820E+00 |
| A18 |  0.000000E+00 |  0.000000E+00 |  0.000000E+00 |  0.000000E+00 |  0.000000E+00 |  0.000000E+00 |
| A20 |  0.000000E+00 |  0.000000E+00 |  0.000000E+00 |  0.000000E+00 |  0.000000E+00 |  0.000000E+00 |

An equation of the aspheric surfaces of the sixth embodiment is the same as that of the first embodiment, and the definitions are the same as well.

The exact parameters of the sixth embodiment based on Table 11 and Table 12 are listed in the following table:

Sixth embodiment (Reference wavelength: 555 nm)

| |f/f1| | |f/f2| | |f/f3| | |f1/f2| | |f2/f3| | TP1/TP2 |
|---|---|---|---|---|---|
| 0.59879 | 0.77434 | 1.28473 | 0.77329 | 0.60272 | 0.86987 |
| ΣPPR | ΣNPR | ΣPPR/\|ΣNPR\| | IN12/f | IN23/f | TP2/TP3 |
| 1.88352 | 0.77434 | 2.43242 | 0.18800 | 0.07517 | 1.14959 |
| TP2/(IN12 + TP2 + IN23) | | (TP1 + IN12)/TP2 | | (TP3 + IN23)/TP2 | |
| 0.48821 | | 1.16930 | | 1.16930 | |
| HOS | InTL | HOS/HOI | InS/HOS | ODT % | TDT % |
| 1.54103 | 0.95804 | 1.49906 | 0.97740 | 3.03681 | 0.55808 |
| HVT21 | HVT22 | HVT31 | HVT32 | HVT32/HOI | HVT32/HOS |
| 0.00000 | 0.04297 | 0.36167 | 0.50526 | 0.49150 | 0.32787 |
| TP1 | TP2 | TP3 | (R1 − R2)/(R1 + R2) | (R3 − R4)/(R3 + R4) | (R5 − R6)/(R5 + R6) |
| 0.2200 | 0.2529 | 0.2200 | −0.9562 | −1.4519 | −0.1555 |
| PLTA | PSTA | NLTA | NSTA | SLTA | SSTA |
| −0.014 mm | −0.006 mm | 0.001 mm | −0.003 mm | −0.001 mm | 0.003 mm |

The results of the equations of the sixth embodiment based on Table 11 and Table 12 are listed in the following table:

| \multicolumn{6}{c}{Values related to the inflection points of the sixth embodiment (Reference wavelength: 555 nm)} |
|---|---|---|---|---|---|

| | | | | | | |
|---|---|---|---|---|---|---|
| HIF111 | 0.0348 | HIF111/HOI | 0.0339 | SGI111 | 0.000013 | \|SGI111\|/(\|SGI111\| + TP1) | 0.0001 |
| HIF211 | 0.2772 | HIF211/HOI | 0.2697 | SGI211 | −0.05628 | \|SGI211\|/(\|SGI211\| + TP2) | 0.2037 |
| HIF212 | 0.3704 | HIF212/HOI | 0.3603 | SGI212 | −0.0851 | \|SGI212\|/(\|SGI212\| + TP2) | 0.2789 |
| HIF221 | 0.0245 | HIF221/HOI | 0.0238 | SGI221 | 0.000055 | \|SGI221\|/(\|SGI221\| + TP2) | 0.0002 |
| HIF222 | 0.3452 | HIF222/HOI | 0.3358 | SGI222 | −0.1176 | \|SGI222\|/(\|SGI222\| + TP2) | 0.3483 |
| HIF311 | 0.1621 | HIF311/HOI | 0.1577 | SGI311 | 0.037287 | \|SGI311\|/(\|SGI311\| + TP3) | 0.1449 |
| HIF321 | 0.2138 | HIF321/HOI | 0.2080 | SGI321 | 0.0503 | \|SGI321\|/(\|SGI321\| + TP3) | 0.1861 |

The figures related to the profile curve lengths obtained based on Table 11 and Table 12 are listed in the following table:

Sixth embodiment (Reference wavelength: 555 nm)

| ARE | ½ (HEP) | ARE value | ARE-½(HEP) | 2(ARE/HEP) % | TP | ARE/TP (%) |
|---|---|---|---|---|---|---|
| 11 | 0.229 | 0.231 | 0.00196 | 100.85% | 0.220 | 105.13% |
| 12 | 0.229 | 0.229 | −0.00030 | 99.87% | 0.220 | 104.10% |
| 21 | 0.229 | 0.233 | 0.00414 | 101.80% | 0.246 | 95.00% |
| 22 | 0.229 | 0.235 | 0.00524 | 102.29% | 0.246 | 95.45% |
| 31 | 0.229 | 0.238 | 0.00883 | 103.85% | 0.220 | 108.25% |
| 32 | 0.229 | 0.237 | 0.00802 | 103.50% | 0.220 | 107.88% |

| ARS | EHD | ARS value | ARS-EHD | (ARS/EHD)% | TP | ARS/TP (%) |
|---|---|---|---|---|---|---|
| 11 | 0.229 | 0.231 | 0.00195 | 100.85% | 0.220 | 105.13% |
| 12 | 0.299 | 0.298 | −0.00048 | 99.84% | 0.220 | 135.49% |
| 21 | 0.361 | 0.374 | 0.01287 | 103.56% | 0.246 | 152.31% |
| 22 | 0.427 | 0.475 | 0.04895 | 111.48% | 0.246 | 193.48% |
| 31 | 0.584 | 0.610 | 0.02598 | 104.45% | 0.220 | 277.26% |
| 32 | 0.751 | 0.787 | 0.03587 | 104.77% | 0.220 | 357.88% |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
   a first lens having positive refractive power;
   a second lens having negative refractive power;
   a third lens having refractive power; and
   an image plane;
   wherein the optical image capturing system having a total of the three lenses with refractive power; each lens among the first lens to the third lens has an object-side surface, which faces the object side, and an image-side surface, which faces the image side; the image-side surface of the first lens is a concave surface on the optical axis; the object-side surface of the second lens is a concave surface on the optical axis, and the image-side surface of the second lens is a concave surface on the optical axis;

wherein the optical image capturing system satisfies:

$1.8 \leq f/HEP \leq 2.4$;

$40 \text{ deg} < HAF \leq 45 \text{ deg}$; and $0.9 \leq 2(ARE/HEP) \leq 2.0$;

wherein f is a focal length of the optical image capturing system; HEP is an entrance pupil diameter of the optical image capturing system; HAF is a half of a maximum view angle of the optical image capturing system; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis.

2. The optical image capturing system of claim 1, wherein the third lens has positive refractive power.

3. The optical image capturing system of claim 1, wherein the optical image capturing system further satisfies:

$0.6 \leq f1/|f2| \leq 1.4$;

wherein f1 is a focal length of the first lens, and f2 is a focal length of the second lens.

4. The optical image capturing system of claim 1, wherein the optical image capturing system further satisfies:

$PLTA \leq 100$ μm;

$PSTA \leq 100$ μm;

$NLTA \leq 100$ μm;

$NSTA \leq 100$ μm;

$SLTA \leq 100$ μm;

$SSTA \leq 100$ μm; and $|TDT| \leq 100\%$;

wherein TDT is a TV distortion; HOI is a maximum height for image formation perpendicular to the optical axis on the image plane; PLTA is a transverse aberration at 0.7 HOI on the image plane in the positive direction of a tangential fan of the optical image capturing system after a longest operation wavelength passing through an edge of the aperture; PSTA is a transverse aberration at 0.7 HOI on the image plane in the positive direction of the tangential fan after a shortest operation wavelength passing through the edge of the aperture; NLTA is a transverse aberration at 0.7 HOI on the image plane in the negative direction of the tangential fan after the longest operation wavelength passing through the edge of the aperture; NSTA is a transverse aberration at 0.7 HOI on the image plane in the negative direction of the tangential fan after the shortest operation wavelength passing through the edge of the aperture; SLTA is a transverse aberration at 0.7 HOI on the image plane of a sagittal fan of the optical image capturing system after the longest operation wavelength passing through the edge of the aperture; SSTA is a transverse aberration at 0.7 HOI on the image plane of a sagittal fan after the shortest operation wavelength passing through the edge of the aperture.

5. The optical image capturing system of claim 1, wherein the optical image capturing system further satisfies:

$0.9 \leq ARS/EHD \leq 2.0$;

wherein, for any surface of any lens, EHD is a maximum effective half diameter thereof, and ARS is a profile curve length measured from a start point where the optical axis passes therethrough, along a surface profile thereof, and finally to an end point of the maximum effective half diameter thereof.

6. The optical image capturing system of claim 1, wherein the optical image capturing system further satisfies:

$0$ mm $< HOS \leq 1.6$ mm;

wherein HOS is a distance between an object-side surface of the first lens and the image plane on the optical axis.

7. The optical image capturing system of claim 1, wherein the optical image capturing system further satisfies:

$0.05 \leq ARE31/TP3 \leq 25$; and $0.05 \leq ARE32/TP3 \leq 25$;

wherein ARE31 is a profile curve length measured from a start point where the optical axis passes the object-side surface of the third lens, along a surface profile of the object-side surface of the third lens, and finally to a coordinate point of a perpendicular distance where is a half of the entrance pupil diameter away from the optical axis; ARE32 is a profile curve length measured from a start point where the optical axis passes the image-side surface of the third lens, along a surface profile of the image-side surface of the third lens, and finally to a coordinate point of a perpendicular distance where is a half of the entrance pupil diameter away from the optical axis; TP3 is a thickness of the third lens on the optical axis.

8. The optical image capturing system of claim 1, wherein the optical image capturing system further satisfies:

$1.3 \leq f1/f3 \leq 2.2$;

wherein f1 is a focal length of the first lens, and f3 is a focal length of the third lens.

9. The optical image capturing system of claim 1, further comprising an aperture, wherein the optical image capturing system further satisfies:

$0.2 \leq InS/HOS \leq 1.1$;

wherein InS is a distance between the aperture and the image plane on the optical axis; HOS is a distance between an object-side surface of the first lens and the image plane on the optical axis.

10. An optical image capturing system, in order along an optical axis from an object side to an image side, comprising:
a first lens having positive refractive power;
a second lens having negative refractive power;
a third lens having positive refractive power; and
an image plane;
wherein the optical image capturing system having a total of the three lenses with refractive power; at least a surface of each of at least one lens among the first lens to the third lens has at least an inflection point; each lens among the first lens to the third lens has an object-side surface, which faces the object side, and an image-side surface, which faces the image side; the object-side surface of the first lens is convex on the optical axis, and the image-side surface of the first lens is concave on the optical axis; the object-side surface of the third lens is convex on the optical axis, and the image-side surface of the third lens is concave on the optical axis;
wherein the optical image capturing system satisfies:

$1.8 \leq f/HEP \leq 2.4$;

$40$ deg $< HAF \leq -45$ deg; and $0.9 \leq 2(ARE/HEP) \leq 2.0$;

wherein f is a focal length of the optical image capturing system; HEP is an entrance pupil diameter of the optical image capturing system; HAF is a half of a maximum view angle of the optical image capturing system; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis.

11. The optical image capturing system of claim 10, wherein the optical image capturing system further satisfies:

$0.9 \leq ARS/EHD \leq 2.0$;

wherein, for any surface of any lens, EHD is a maximum effective half diameter thereof, and ARS is a profile curve length measured from a start point where the optical axis passes therethrough, along a surface profile thereof, and finally to an end point of the maximum effective half diameter thereof.

12. The optical image capturing system of claim 10, wherein the object-side surface and the image-side surface of the second lens both have at least two inflection points.

13. The optical image capturing system of claim 10, wherein the optical image capturing system further satisfies:

$TP2>TP1$; and $TP2>TP3$;

wherein TP1 is a thickness of the first lens on the optical axis; TP2 is a thickness of the second lens on the optical axis; TP3 is a thickness of the third lens on the optical axis.

14. The optical image capturing system of claim 10, wherein the optical image capturing system further satisfies:

$1.1 \leq TP2/TP3 \leq 1.4$;

wherein TP2 is a thickness of the second lens on the optical axis; TP3 is a thickness of the third lens on the optical axis.

15. The optical image capturing system of claim 10, wherein the optical image capturing system further satisfies:

$1.4 \leq HOS/f \leq 1.6$;

wherein HOS is a distance between an object-side surface of the first lens and the image plane on the optical axis.

16. The optical image capturing system of claim 10, wherein the optical image capturing system further satisfies:

$1.4 \leq HOS/HOI \leq 1.6$;

wherein HOS is a distance between an object-side surface of the first lens and the image plane on the optical axis; HOI is a maximum height for image formation perpendicular to the optical axis on the image plane.

17. The optical image capturing system of claim 10, wherein the optical image capturing system further satisfies:

$-1.0 \leq (R1-R2)/(R1+R2) \leq -0.7$;

wherein R1 is a radius of curvature of the object-side surface of the first lens, and R2 is a radius of curvature of the image-side surface of the first lens.

18. The optical image capturing system of claim 10, wherein the optical image capturing system further satisfies:

$-1.5 \leq (R3-R4)/(R3+R4) \leq -1.0$;

wherein R3 is a radius of curvature of the object-side surface of the second lens, and R4 is a radius of curvature of the image-side surface of the second lens.

19. The optical image capturing system of claim 10, wherein the optical image capturing system further satisfies:

$-0.2 \leq (R5-R6)/(R5+R6) \leq -0.06$;

wherein R5 is a radius of curvature of the object-side surface of the third lens, and R6 is a radius of curvature of the image-side surface of the third lens.

20. An optical image capturing system, in order along an optical axis from an object side to an image side, comprising:
   a first lens having positive refractive power;
   a second lens having negative refractive power;
   a third lens having positive refractive power; and
   an image plane;
   wherein the optical image capturing system having a total of the three lenses having refractive power; each lens among the first lens to the third lens has an object-side surface, which faces the object side, and an image-side surface, which faces the image side; the image-side surface of the first lens is concave on the optical axis; the object-side surface of the second lens is a concave surface on the optical axis, and the image-side surface of the second lens is a concave surface on the optical axis; each of the object-side surface and the image-side surface of the second lens has at least two inflection points thereon;
   wherein the optical image capturing system satisfies:

$2.0 \leq f/HEP \leq 2.4$;

$42 \text{ deg} < HAF \leq 45 \text{ deg}$;

$0.9 \leq 2(ARE/HEP) \leq 2.0$; and $1.4 \leq HOS/HOI \leq 1.6$;

wherein f is a focal length of the optical image capturing system; HEP is an entrance pupil diameter of the optical image capturing system; HOS is a distance between an object-side surface of the first lens and the image plane on the optical axis; HAF is a half of a maximum view angle of the optical image capturing system; HOI is a maximum height for image formation perpendicular to the optical axis on the image plane; for any surface of any lens, ARE is a profile curve length measured from a start point where the optical axis passes therethrough, along a surface profile thereof, and finally to a coordinate point of a perpendicular distance where is a half of the entrance pupil diameter away from the optical axis.

21. The optical image capturing system of claim 20, wherein the optical image capturing system further satisfies:

$0.9 \leq ARS/EHD \leq 2.0$;

wherein, for any surface of any lens, EHD is a maximum effective half diameter thereof, ARS is a profile curve length measured from a start point where the optical axis passes therethrough, along a surface profile thereof, and finally to an end point of the maximum effective half diameter thereof.

22. The optical image capturing system of claim 20, wherein the optical image capturing system further satisfies:

$TP2>TP1$; and $TP2>TP3$;

wherein TP1 is a thickness of the first lens on the optical axis; TP2 is a thickness of the second lens on the optical axis; TP3 is a thickness of the third lens on the optical axis.

23. The optical image capturing system of claim 20, wherein the optical image capturing system further satisfies:

$1.3 \leq f1/f3 \leq 2.2$;

wherein f1 is a focal length of the first lens, and f3 is a focal length of the third lens.

24. The optical image capturing system of claim 20, wherein the optical image capturing system further satisfies:

$IN12/IN23 \geq 1$;

wherein IN12 is a distance between the first lens and the second lens on the optical axis; IN23 is a distance between the second lens and the third lens on the optical axis.

25. The optical image capturing system of claim 20, further comprising an aperture an image sensor, and a driving module, wherein the image sensor is disposed on the image plane; the driving module is coupled with the lenses to move the lenses; the optical image capturing system further satisfies:

$$0.2 \leq InS/HOS \leq 1.1; \tag{5}$$

wherein InS is a distance between the aperture and the image plane.

\* \* \* \* \*